(12) United States Patent
Bartholomew et al.

(10) Patent No.: US 12,163,069 B2
(45) Date of Patent: Dec. 10, 2024

(54) POST-POLYMERIZATION FUNCTIONALIZATION OF PENDANT FUNCTIONAL GROUPS

(71) Applicant: Avery Dennison Corporation, Mentor, OH (US)

(72) Inventors: Eric L. Bartholomew, Mill Hall, PA (US); William Bottorf, Mill Hall, PA (US); Kyle R. Heimbach, Millmont, PA (US); Brandon S. Miller, Lock Haven, PA (US); Michael T. Waterman, Chardon, OH (US); Michael Zajaczkowski, Bellefonte, PA (US)

(73) Assignee: Avery Dennison Corporation, Mentor, OH (US)

( * ) Notice: Subject to any disclaimer, the term of this patent is extended or adjusted under 35 U.S.C. 154(b) by 952 days.

(21) Appl. No.: 16/761,945

(22) PCT Filed: Dec. 19, 2018

(86) PCT No.: PCT/US2018/066510
§ 371 (c)(1),
(2) Date: May 6, 2020

(87) PCT Pub. No.: WO2019/126327
PCT Pub. Date: Jun. 27, 2019

(65) Prior Publication Data
US 2023/0159796 A1    May 25, 2023

Related U.S. Application Data

(60) Provisional application No. 62/607,437, filed on Dec. 19, 2017.

(51) Int. Cl.
*C09J 7/38* (2018.01)
*C08F 290/12* (2006.01)
(Continued)

(52) U.S. Cl.
CPC .......... *C09J 7/387* (2018.01); *C08F 290/126* (2013.01); *C08F 293/005* (2013.01); *C09J 4/06* (2013.01);
(Continued)

(58) Field of Classification Search
None
See application file for complete search history.

(56) References Cited

U.S. PATENT DOCUMENTS

| | | |
|---|---|---|
| 3,252,950 A | 5/1966 | Terenzi et al. |
| 3,697,402 A | 10/1972 | Clifton et al. |

(Continued)

FOREIGN PATENT DOCUMENTS

| | | |
|---|---|---|
| CN | 102037091 | 4/2011 |
| CN | 103476816 | 12/2013 |

(Continued)

OTHER PUBLICATIONS

Liu et al. (2001), Preparation and characterization of photoreactive copolymers containing curable pendants for positive photoresist. J. Appl. Polym. Sci., 80: 328-333. (Year: 2001).*

(Continued)

*Primary Examiner* — Sanza L. McClendon

(57) ABSTRACT

Modification of functional groups along a polymer backbone to render the groups activatable upon exposure to actinic radiation is described. The polymers are typically controlled architecture polymers. Also described are adhesives containing the modified architectured polymers and related methods of use.

30 Claims, 13 Drawing Sheets

(51) Int. Cl.
    *C08F 293/00* (2006.01)
    *C09J 4/06* (2006.01)
(52) U.S. Cl.
    CPC ...... *C08F 2438/02* (2013.01); *C08F 2810/30* (2013.01); *C09J 2301/302* (2020.08); *C09J 2301/416* (2020.08); *C09J 2451/00* (2013.01)

(56) References Cited

U.S. PATENT DOCUMENTS

| | | | |
|---|---|---|---|
| 3,993,549 A | 11/1976 | Bush et al. |
| 4,118,595 A | 10/1978 | Pfahni et al. |
| 4,232,058 A | 11/1980 | Dow et al. |
| 4,279,590 A | 7/1981 | Dow et al. |
| 4,291,087 A | 9/1981 | Warburton, Jr. |
| 4,713,273 A | 12/1987 | Freedman |
| 4,740,532 A | 4/1988 | May, Jr. et al. |
| 4,912,169 A | 3/1990 | Whitmire et al. |
| 4,916,184 A | 4/1990 | Clark |
| 4,948,819 A | 8/1990 | Green et al. |
| 4,952,711 A | 8/1990 | Jacobine et al. |
| 5,028,661 A | 7/1991 | Clark et al. |
| 5,096,963 A | 3/1992 | Blain |
| 5,102,924 A | 4/1992 | Williams et al. |
| 5,178,710 A | 1/1993 | Hikmet et al. |
| 5,217,654 A | 6/1993 | Buckley |
| 5,268,396 A | 12/1993 | Lai |
| 5,298,554 A | 3/1994 | Rehmer et al. |
| 5,324,078 A | 6/1994 | Bane |
| 5,342,582 A | 8/1994 | Horn et al. |
| 5,358,976 A | 10/1994 | Dowling et al. |
| 5,521,227 A | 5/1996 | Palazzotto et al. |
| 5,585,415 A | 12/1996 | Gorzalski et al. |
| 5,683,741 A | 11/1997 | Seng et al. |
| 5,770,331 A | 6/1998 | Olsen et al. |
| 5,847,021 A | 12/1998 | Tortorello et al. |
| 5,894,050 A | 4/1999 | Camps et al. |
| 5,932,113 A | 8/1999 | Kurdi et al. |
| 5,958,468 A | 9/1999 | Kunkel et al. |
| 6,008,264 A | 12/1999 | Ostler et al. |
| 6,014,488 A | 1/2000 | Shustack |
| 6,045,953 A | 4/2000 | Ohe et al. |
| 6,107,361 A | 8/2000 | Tortorello et al. |
| 6,344,532 B1 | 2/2002 | Kim et al. |
| 6,358,354 B1 | 3/2002 | Patil |
| 6,359,742 B1 | 3/2002 | Canty et al. |
| 6,392,725 B1 | 5/2002 | Harada et al. |
| 6,432,475 B1 | 8/2002 | Yamamoto et al. |
| 6,444,368 B1 | 9/2002 | Hikmet et al. |
| 6,514,373 B1 | 2/2003 | Hill et al. |
| 6,517,661 B2 | 2/2003 | Hill et al. |
| 6,524,881 B1 | 2/2003 | Tandy et al. |
| 6,551,439 B1 | 4/2003 | Hill et al. |
| 6,624,915 B1 | 9/2003 | Kirkpatrick et al. |
| 6,632,535 B1 | 10/2003 | Buazza et al. |
| 6,636,291 B2 | 10/2003 | Van De Witte et al. |
| 6,649,259 B1 | 11/2003 | Hu et al. |
| 6,652,281 B1 | 11/2003 | Eckhardt et al. |
| 6,677,402 B2 | 1/2004 | Gaddam et al. |
| 6,692,978 B2 | 2/2004 | Tandy et al. |
| 6,734,032 B2 | 5/2004 | Tandy et al. |
| 6,743,852 B2 | 6/2004 | Dershem et al. |
| 6,767,974 B1 | 7/2004 | Keoshkerian et al. |
| 6,821,455 B2 | 11/2004 | Kornfield et al. |
| 6,836,371 B2 | 12/2004 | Lai et al. |
| 6,855,226 B2 | 2/2005 | Hill et al. |
| 6,897,915 B1 | 5/2005 | Lavrentovich et al. |
| 6,939,428 B2 | 9/2005 | Hill et al. |
| 7,008,675 B2 | 3/2006 | Kornfield et al. |
| 7,009,668 B2 | 3/2006 | Van De Witte et al. |
| 7,038,670 B2 | 5/2006 | Liang et al. |
| 7,074,295 B2 | 7/2006 | Bellafore et al. |
| 7,094,618 B2 | 8/2006 | Tandy et al. |
| 7,157,535 B2 | 1/2007 | Herr et al. |
| 7,176,044 B2 | 2/2007 | Forray et al. |
| 7,179,509 B2 | 2/2007 | Komfield et al. |
| 7,229,517 B2 | 6/2007 | Bellafore et al. |
| 7,232,540 B2 | 6/2007 | Gould et al. |
| 7,232,595 B2 | 6/2007 | Coykendall et al. |
| 7,238,543 B2 | 7/2007 | Tandy et al. |
| 7,256,221 B2 | 8/2007 | Coykendall et al. |
| 7,271,947 B2 | 9/2007 | Liang et al. |
| 7,300,688 B2 | 11/2007 | Wilderbeek et al. |
| 7,339,579 B2 | 3/2008 | Richter et al. |
| 7,372,480 B1 | 5/2008 | Lavrentovich et al. |
| 7,416,707 B2 | 8/2008 | Imai |
| 7,517,925 B2 | 4/2009 | Dershem et al. |
| 7,528,404 B2 | 5/2009 | Musa et al. |
| 7,601,786 B2 | 10/2009 | Gillett et al. |
| 7,605,190 B2 | 10/2009 | Moszner et al. |
| 7,691,479 B2 | 4/2010 | Schmatloch et al. |
| 7,745,535 B2 * | 6/2010 | Schmidt ............ C08F 293/005 |
| | | | 525/89 |
| 7,763,330 B2 | 7/2010 | Lub et al. |
| 7,781,493 B2 | 8/2010 | Balkerikar et al. |
| 7,786,183 B2 | 8/2010 | Baikerikar et al. |
| 7,795,364 B2 | 9/2010 | Herr et al. |
| 7,799,884 B2 | 9/2010 | Herr et al. |
| 7,806,016 B2 | 10/2010 | Shimizu et al. |
| 7,824,740 B2 | 11/2010 | Kawanishi et al. |
| 7,837,941 B2 | 11/2010 | Harding et al. |
| 7,851,254 B2 | 12/2010 | Forray et al. |
| 7,939,161 B2 | 5/2011 | Allam et al. |
| 7,940,000 B2 | 5/2011 | Koshiyarna et al. |
| 7,955,696 B2 | 6/2011 | Baikerikar et al. |
| 7,956,151 B2 | 6/2011 | Schmatloch et al. |
| 7,978,302 B2 | 7/2011 | Peeters et al. |
| 8,022,437 B2 | 9/2011 | Koyarna |
| 8,040,049 B2 | 10/2011 | Kimura et al. |
| 8,080,299 B2 | 12/2011 | Baikerikar et al. |
| 8,080,609 B2 | 12/2011 | Schmatloch |
| 8,083,321 B2 | 12/2011 | Krawczyk et al. |
| 8,147,974 B2 | 4/2012 | Baikerikar et al. |
| 8,183,305 B2 | 5/2012 | Neffgen et al. |
| 8,194,044 B2 | 6/2012 | Richter et al. |
| 8,236,480 B2 | 8/2012 | Locascio et al. |
| 8,273,801 B2 | 9/2012 | Baikerikar et al. |
| 8,298,368 B2 | 10/2012 | Schmatloch et al. |
| 8,304,061 B2 | 11/2012 | Feldman et al. |
| 8,349,410 B2 | 1/2013 | Huang et al. |
| 8,378,052 B2 | 2/2013 | Harvey et al. |
| 8,415,010 B2 | 4/2013 | Liu et al. |
| 8,420,704 B2 | 4/2013 | Hillmyer et al. |
| 8,603,630 B2 * | 12/2013 | Takahashi ............ H01L 21/6836 |
| | | | 522/116 |
| 8,686,060 B2 * | 4/2014 | Smith .................... C09J 133/08 |
| | | | 520/1 |
| 8,735,506 B2 | 5/2014 | Hammond et al. |
| 8,808,811 B2 | 8/2014 | Kolb et al. |
| 8,980,967 B2 | 3/2015 | Krepski et al. |
| 9,012,127 B2 | 4/2015 | Bowman et al. |
| 9,175,098 B2 | 11/2015 | Nielsen et al. |
| 9,243,172 B2 * | 1/2016 | Krepski ................ C09J 133/06 |
| 9,469,794 B2 | 10/2016 | Liu et al. |
| 9,546,305 B2 | 1/2017 | Hammond et al. |
| 9,644,063 B2 | 5/2017 | Miller et al. |
| 9,670,295 B2 | 6/2017 | Palasz et al. |
| 9,738,740 B2 * | 8/2017 | Lester ................ C08F 293/005 |
| 9,890,305 B2 | 2/2018 | Suwa et al. |
| 10,287,463 B2 * | 5/2019 | Behling ................... B05D 3/06 |
| 10,287,464 B2 * | 5/2019 | Gower ............... C08F 220/1804 |
| 10,407,525 B2 * | 9/2019 | Lester ..................... C09J 153/00 |
| 10,414,953 B2 | 9/2019 | Bartholomew et al. |
| 10,526,511 B2 * | 1/2020 | Hartinger ............... C08F 265/04 |
| 10,640,595 B2 * | 5/2020 | Bartholomew .......... C09J 7/387 |
| 10,941,321 B2 * | 3/2021 | Behling .................. C08F 265/04 |
| 11,117,994 B2 * | 9/2021 | Lester ..................... C09J 133/08 |
| 11,267,999 B2 * | 3/2022 | Gower ................ C09J 153/005 |
| 11,312,884 B2 * | 4/2022 | Bartholomew .......... B01J 19/006 |
| 11,608,399 B2 * | 3/2023 | Behling ............... C08F 220/1804 |
| 2002/0098608 A1 | 7/2002 | Tandy et al. |
| 2002/0168501 A1 | 11/2002 | Sigel et al. |
| 2003/0003688 A1 | 1/2003 | Tandy et al. |
| 2003/0015688 A1 | 1/2003 | Hikmet |
| 2003/0059188 A1 | 3/2003 | Baker et al. |

(56) References Cited

U.S. PATENT DOCUMENTS

| | | |
|---|---|---|
| 2003/0096111 A1 | 5/2003 | Husemann et al. |
| 2003/0166985 A1 | 9/2003 | Patil et al. |
| 2004/0029044 A1 | 2/2004 | Severance et al. |
| 2004/0048988 A1 | 3/2004 | Gillett et al. |
| 2004/0077744 A1 | 4/2004 | Naylor et al. |
| 2004/0082683 A1 | 4/2004 | Karim et al. |
| 2004/0161876 A1 | 8/2004 | Tandy et al. |
| 2004/0191420 A1 | 9/2004 | Rearick et al. |
| 2004/0257508 A1 | 12/2004 | Van de Witte et al. |
| 2005/0000643 A1 | 1/2005 | Bellafore et al. |
| 2005/0070655 A1 | 3/2005 | Van Den Bergen et al. |
| 2005/0119366 A1 | 6/2005 | Moy et al. |
| 2005/0136077 A1 | 6/2005 | Yahiaoui et al. |
| 2005/0165164 A1 | 7/2005 | Moeller et al. |
| 2005/0174412 A1 | 8/2005 | Codos et al. |
| 2005/0208285 A1 | 9/2005 | Lyons et al. |
| 2005/0250906 A1 | 11/2005 | Husemann |
| 2006/0079011 A1 | 4/2006 | Tandy et al. |
| 2006/0086448 A1 | 4/2006 | Verstegen et al. |
| 2006/0110596 A1 | 5/2006 | Palasz et al. |
| 2006/0142408 A1 | 6/2006 | Liu et al. |
| 2006/0229377 A1 | 10/2006 | Bublewitz et al. |
| 2007/0072098 A1 | 3/2007 | Hikmet |
| 2007/0077402 A1 | 4/2007 | Sigel et al. |
| 2007/0142589 A1 | 6/2007 | Rogers et al. |
| 2007/0179240 A1 | 8/2007 | Chalmers et al. |
| 2007/0187656 A1 | 8/2007 | Evans et al. |
| 2007/0249794 A1 | 10/2007 | Evans et al. |
| 2007/0257238 A1 | 11/2007 | Misura et al. |
| 2007/0258238 A1 | 11/2007 | Handsaker |
| 2007/0265391 A1 | 11/2007 | Yang et al. |
| 2007/0295616 A1 | 12/2007 | Harding et al. |
| 2008/0054171 A1 | 3/2008 | Bonn et al. |
| 2008/0093776 A1 | 4/2008 | Williams |
| 2008/0094556 A1 | 4/2008 | Van Der Zande et al. |
| 2008/0106002 A1 | 5/2008 | Feldman et al. |
| 2008/0214712 A1 | 9/2008 | Passade et al. |
| 2008/0250130 A1 | 10/2008 | Li et al. |
| 2008/0311404 A1 | 12/2008 | Diggins |
| 2008/0312354 A1 | 12/2008 | Krawczyk et al. |
| 2009/0015771 A1 | 1/2009 | Hikmet et al. |
| 2009/0015930 A1 | 1/2009 | Hikmet et al. |
| 2009/0093584 A1 | 4/2009 | Gelles et al. |
| 2009/0096136 A1 | 4/2009 | Hawker et al. |
| 2009/0208553 A1 | 8/2009 | Kemp et al. |
| 2009/0288771 A1 | 11/2009 | Farrell et al. |
| 2010/0068231 A1 | 3/2010 | Favre et al. |
| 2010/0109317 A1 | 5/2010 | Hoffmuller |
| 2010/0215659 A1 | 8/2010 | Ladet |
| 2010/0255239 A1 | 10/2010 | Hammond et al. |
| 2011/0026118 A1 | 2/2011 | Seesselberg et al. |
| 2011/0111350 A1 | 5/2011 | Lakshmi et al. |
| 2011/0118372 A1 | 5/2011 | Lester et al. |
| 2011/0319558 A1 | 12/2011 | Rehnberg et al. |
| 2012/0021134 A1 | 1/2012 | Kolb et al. |
| 2012/0277341 A1 | 11/2012 | Smith et al. |
| 2013/0059971 A1 | 3/2013 | Miller et al. |
| 2013/0081687 A1 | 4/2013 | Wu et al. |
| 2013/0094789 A1 | 4/2013 | Hoffman et al. |
| 2013/0103157 A1 | 4/2013 | Kourtis et al. |
| 2013/0109262 A1 | 5/2013 | Zhou |
| 2013/0237626 A1 | 9/2013 | Bishop et al. |
| 2014/0008319 A1 | 1/2014 | Buxton-Dakides |
| 2014/0039083 A1 | 2/2014 | Krepski et al. |
| 2014/0061027 A1 | 3/2014 | Polwart et al. |
| 2014/0065325 A1 | 3/2014 | Guo et al. |
| 2014/0066539 A1 | 3/2014 | Tobing et al. |
| 2014/0158296 A1 | 6/2014 | Wigdorski et al. |
| 2014/0179820 A1 | 6/2014 | Prenzel |
| 2014/0228463 A1 | 8/2014 | Gupta et al. |
| 2014/0329958 A1 | 11/2014 | Lester et al. |
| 2014/0360975 A1 | 12/2014 | Hustad et al. |
| 2015/0105488 A1 | 4/2015 | Madsen et al. |
| 2015/0152298 A1 | 6/2015 | Krepski et al. |
| 2015/0299475 A1 | 10/2015 | Porosa et al. |
| 2015/0367600 A1 | 12/2015 | Niimi et al. |
| 2016/0023980 A1 | 1/2016 | Chisholm et al. |
| 2016/0068718 A1 | 3/2016 | Suwa et al. |
| 2016/0168298 A1 | 6/2016 | Woods et al. |
| 2016/0289513 A1 | 10/2016 | Behling et al. |
| 2017/0174902 A1 | 6/2017 | Epple et al. |
| 2017/0217791 A1 | 8/2017 | McNulty et al. |
| 2017/0227407 A1 | 8/2017 | Yeo et al. |
| 2018/0051194 A1 | 2/2018 | Palasz |
| 2018/0243463 A1 | 8/2018 | Chatterjee et al. |
| 2020/0299965 A1 | 9/2020 | Tang et al. |

FOREIGN PATENT DOCUMENTS

| | | | |
|---|---|---|---|
| CN | 103998481 | | 8/2014 |
| CN | 201480056971.6 | | 10/2014 |
| CN | 105131849 | | 12/2015 |
| CN | 105164187 | | 12/2015 |
| CN | 106459617 | | 2/2017 |
| CO | 2017/0011546 | | 3/2018 |
| DE | 102005043222 | | 3/2007 |
| EP | 1130070 | | 8/2002 |
| EP | 1477511 | | 11/2004 |
| EP | 1595930 | | 11/2005 |
| GB | 2491643 | | 12/2012 |
| JP | 10-147632 | | 6/1998 |
| JP | 11335648 A | * | 12/1999 |
| JP | 2000015754 A | * | 1/2000 |
| JP | 2000017121 A | * | 1/2000 |
| JP | 2000303047 A | * | 10/2000 |
| JP | 2001261726 A | * | 9/2001 |
| JP | 2001288229 A | * | 10/2001 |
| JP | 2011-184678 | | 9/2011 |
| JP | 2012-072235 | | 4/2012 |
| JP | 2014-517095 | | 7/2014 |
| JP | 2014-152294 | | 8/2014 |
| JP | 2014-213572 | | 11/2014 |
| JP | 2015040257 A | * | 3/2015 |
| JP | 2015-086371 | | 5/2015 |
| KR | 10-2003-0072566 | | 9/2003 |
| KR | 10-2010-0137520 | | 12/2010 |
| KR | 2013-0130927 | | 12/2013 |
| KR | 1020130130927 | | 12/2013 |
| KR | 10-2014-0012674 | | 2/2014 |
| KR | 1020140030206 | | 3/2014 |
| WO | WO-9910443 A1 * | 3/1999 | ......... C03C 25/1065 |
| WO | 01/94211 | | 6/2002 |
| WO | 2005/119366 | | 12/2006 |
| WO | 2008/052131 | | 5/2008 |
| WO | 2009/048968 | | 4/2009 |
| WO | 2009/117654 | | 9/2009 |
| WO | 2012/126724 | | 9/2012 |
| WO | 2012/168694 | | 12/2012 |
| WO | 2014/186265 | | 11/2014 |
| WO | 2015/143290 | | 9/2015 |
| WO | 2016/100251 | | 6/2016 |
| WO | 2016/153592 | | 9/2016 |
| WO | 2016/177861 | | 11/2016 |
| WO | 2016/179076 | | 11/2016 |

OTHER PUBLICATIONS

Gauthier et al. (2009), Synthesis of Functional Polymers by Post-Polymerization Modification. Angew. Chem. Int. Ed., 48: 48-58. (Year: 2009).*

Hawker et al. External Regulation of Controlled Polymerizations. Angew. Chem. Int. Ed. 2013, 52, 199-210 (Year: 2013).*

International Search Report and Written Opinion dated Jan. 23, 2018 issued in corresponding IA No. PCT/US2017/058284 filed Oct. 25, 2017.

Rudolph et al., "Selective crosslinking or addressing of individual domains within block copolymer nanostructures," European Polymer Journal 80, 2016, pp. 317-331.

An et al., "Multifunctional Linear Methacrylate Copolymer Polyenes Having Pendant Vinyl Groups: Synthesis and Photoinduced Thiol-Ene Crosslinking Polyaddition," Journal of Polymer Science, Part A: Polymer Chemistry, 2014, 52, pp. 572-581.

(56) References Cited

OTHER PUBLICATIONS

DiPasquale et al., "Controlled architecture for improved macromolecular memory within polymer networks," Current Opinion in Biotechnology, 2016, 40, pp. 170-176.

International Search Report and Written Opinion dated Jul. 9, 2015 Issued in corresponding IA No. PCT/US2015/023591 filed Mar. 31, 2015.

International Preliminary Report on Patentability dated Oct. 4, 2016 issued in corresponding IA No. PCT/US2015/023591 filed Mar. 31, 2015.

International Search Report and Written Opinion dated Jul. 4, 2017 issued in corresponding IA No. PCT/US2017/018568 filed Feb. 20, 2017.

Invitation to Pay Additional Fees dated May 17, 2017 issued in corresponding IA No. PCT/US2017/018568 filed Feb. 20, 2017.

International Preliminary Report on Patentability dated Jul. 10, 2018 issued in corresponding IA No. PCT/US2017/018568 filed Feb. 20, 2017.

Invitation to Restrict or Pay Additional Fees of the IPEA dated Mar. 13, 2018 issued in corresponding IA No. PCT/US2017/018568 filed Feb. 20, 2017.

Written Opinion of the IPEA dated Apr. 26, 2018 issued in corresponding IA No. PCT/US2017/018568 filed Feb. 20, 2017.

International Search Report dated Mar. 11, 2019 issued in corresponding IA No. PCT/US2018/066510 filed Dec. 19, 2018.

International Preliminary Report on Patentability dated Apr. 30, 2019 issued in corresponding IA No. PCT/US2017/058284 filed Oct. 25, 2017.

International Preliminary Report on Patentability dated Jun. 23, 2020 issued in corresponding IA No. PCT/US2018/066510 filed Dec. 19, 2018.

Hu, Yuhong et al., "Block Copolymer-Based Hot Melt Pressure-Sensitive Adhesives," Handbook of Pressure-Sensitive Adhesives and Products, copyright 2009, pp. 3-1-3-2.

* cited by examiner

POST-POLYMERIZATION FUNCTIONALIZATION OF PENDANT FUNCTIONAL GROUPS

CROSS-REFERENCE TO RELATED APPLICATION

The present application is a 371 of International Application No. PCT/US2018/066510, which was published in English on Jun. 27, 2019, and claims the benefit of U.S. Provisional Patent Application No. 62/607,437 filed Dec. 19, 2017, both of which are incorporated herein by reference in their entireties.

FIELD

The present subject matter relates to methods of modifying functional groups incorporated along a polymer backbone and/or pendant groups into UV-activatable groups. In many embodiments, the modification is performed using architectured polymers having functional groups at particular locations or regions along the polymer backbone. The present subject matter also relates to compositions, adhesives and pre-adhesive compositions containing the modified polymers, articles utilizing the adhesives, and systems for processing the adhesives.

BACKGROUND

Adhesives that are cured by exposure to UV radiation are known in the art. The use of controlled architecture polymers in adhesive formulations is also known and has been described by Applicant. It is additionally known in the art that functional groups along many conventional polymers can be modified to be UV-activatable.

However, a need exists for forming adhesive compositions that utilize controlled architecture polymers that upon activation, such as by exposure to UV radiation, exhibit particular properties and/or characteristics.

SUMMARY

The difficulties and drawbacks associated with previous approaches are addressed in the present subject matter as follows.

In one aspect, the present subject matter provides a composition comprising, consisting essentially of, or consisting of a precursor and a reacting agent. The precursor comprising at least one acrylic block copolymer, the at least one acrylic block copolymer comprising (i) a first reactive segment of controlled molecular weight and position that comprises at least one monomer having a functional group selected from the group consisting of a self-reactive functional group, a reactive functional group, a non-reactive functional group, and combinations thereof and (ii) a second segment of controlled molecular weight and position that includes at least one monomer having a functional group selected from the group consisting of a reactive functional group, a non-reactive functional group, and combinations thereof. The reactive functionalities in the first reactive segment and the second segment may be the same or different from one another. The non-reactive functionalities in the first reactive segment and the second segment may be the same or different from one another. At least one of the functional groups of the at least one acrylic block copolymer can undergo a post-polymerization functionalization reaction with the reacting agent to make the at least one acrylic block copolymer crosslinkable upon exposure to an actinic radiation. The at least one acrylic block copolymer is not crosslinkable upon exposure to the actinic radiation prior to the post-polymerization functionalization reaction. Notably, (i) the at least one acrylic block copolymer does not contain ethylenic unsaturation along the polymer backbone and/or pendant groups, (ii) the reacting agent comprises at least one of a double bond and a functional group, the functional group being capable of reacting with at least one of the functional group of the at least one acrylic block copolymer, (iii) the post-polymerization functionalization reaction is an acrylation reaction, and (iv) the post-polymerization functionalization reaction produces a n ethylenically unsaturated bond on the at least one acrylic block copolymer, the ethylenically unsaturated bond being a double bond. The precursor forms a pre-adhesive composition after the post-polymerization functionalization reaction of the at least one acrylic block copolymer and the said pre-adhesive is at least partially crosslinkable upon exposure to the actinic radiation to form an adhesive. The adhesive formed may be a pressure sensitive adhesive. The actinic radiation is at least one of UV radiation and electron beam radiation.

In some embodiments, the first reactive segment comprises at least one monomer having a non-reactive functional group and at least one polymerizable comonomer having a crosslinkable functionality, the crosslinkable functionality comprising a self-reactive functional group and a reactive functional group while the second segment comprises at least one monomer having a reactive functional group and at least one monomer having a non-reactive functional group. In other embodiments, the first reactive segment comprises at least one monomer having a non-reactive functional group and at least one polymerizable comonomer having a crosslinkable functionality, the crosslinkable functionality comprising only a self-reactive functional group while the second segment comprises at least one monomer having only a non-reactive functional group. In still other embodiments, the first reactive segment comprises at least one monomer having a non-reactive functional group and at least one polymerizable comonomer having a crosslinkable functionality, the crosslinkable functionality comprising only a reactive functional group while the second segment comprises at least one monomer having only a non-reactive functional group.

Importantly, in all the above described embodiments of the subject matter, (i) the functional group of the at least one acrylic block copolymer that undergoes the post-polymerization reaction may be the same or different from the functional group of the reacting agent, (ii) the at least one monomer having a non-reactive functional group within the first reactive segment and the second segment may be the same or different from one another, (iii) the at least one monomer having a reactive functional group within the first reactive segment and the second segment may be the same or different from one another, (iv) the first reactive segment(s) include about 40% to about 99%, or about 45% to about 99%, or about 50% to about 99%, or about 55% to about 99%, or about 60% to about 99%, or about 65% to about 99%, or about 70% to about 99%, or about 75% to about 99%, or about 80% to about 99%, or about 85% to about 99%, or about 90% to about 99%, or about 95% to about 99% by weight of one or more non-reactive monomers, (v) The first reactive segment(s) comprises about 40% to about 99%, or about 45% to about 99%, or about 50% to about 99%, or about 55% to about 99%, or about 60% to about 99%, or about 65% to about 99%, or about 70% to about 99%, or about 75% to about 99%, or about 80% to about 99%, or about 85% to about 99%, or about 90% to about 99%, or about 95% to about 99% by weight of one or more monomers of the second segment, (vi) the first reactive segment and the second segment are molecularly miscible (homogeneous) before cure or prior to crosslinking as expressed by their properties in the bulk state that are indicative of a single phase polymer, and (vii) at least one of the precursor and pre-adhesive composition is a homogeneous (single phase) polymer or a liquid polymer at a temperature range of from 15° C. to 200° C.

In another aspect, the acrylic block copolymer described above comprises two first reactive segments A of controlled molecular weight and position and one second segment B of controlled molecular weight and position, wherein the first reactive segments A are positioned on either side of a middle second segment B on the polymer chain to define an ABA structure.

In yet another aspect, the acrylic block copolymer described above comprises two second segments B of controlled molecular weight and position and one first reactive segment A of controlled molecular weight and position, wherein the two second segments B are positioned on either side of a middle first reactive segment A on the polymer chain to define an BAB structure.

In still another aspect, the present subject matter provides a pre-adhesive comprising the precursor described above wherein at least a portion of the functional groups of the acrylic block copolymer of the said precursor include ethylenically unsaturated bonds.

In another aspect, the present subject matter provides a composition comprising the precursor described above and a monomer having an acrylating functional group wherein at least one of the functional groups of the at least one acrylic block copolymer can undergo a post-polymerization functionalization reaction with the acrylating functional group to make the at least one acrylic block copolymer crosslinkable upon exposure to an actinic radiation.

In one aspect, the present subject matter provides a method of forming a pre-adhesive composition curable upon exposure to actinic radiation. The method comprises providing the precursor described above. The method also comprises modifying at least a portion of the functional groups of the acrylic block copolymer of the said precursor to form the pre-adhesive composition wherein the modifying produces ethylenically unsaturated bonds on the acrylic block copolymer that upon exposure to actinic radiation, effect curing of the pre-adhesive composition to thereby produce an adhesive composition.

In another aspect, the present subject matter provides pre-adhesive compositions produced by the noted method.

In still another aspect, the present subject matter also provides a method of forming an adhesive composition comprising providing the precursor described above, said precursor comprising the acrylic block copolymer described above. At least a portion of the functional groups of the said acrylic block copolymer include ethylenically unsaturated bonds. The method also comprises exposing the pre-adhesive composition to actinic radiation to thereby at least partially cure the pre-adhesive composition and form the adhesive composition.

In yet another aspect, the present subject matter provides adhesive compositions produced by the noted method.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
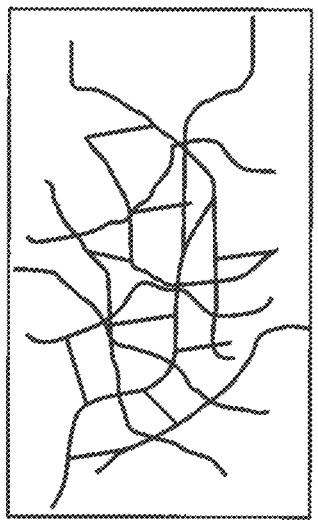
FIG. 1 is a schematic illustration depicting a conventional polymer including various reactive functional groups and upon exposure to UV radiation, formation of a conventional randomly crosslinked network.
Figure 1:
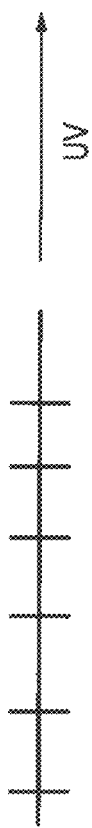

As used herein, terms such as "typically" are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

As used herein, the terms "comprise(s)," "include(s)," "having," "has," "contain(s)," and variants thereof, are intended to be open-ended transitional phrases, terms, or words that do not preclude the possibility of additional acts or structure.

As used herein, the term "polymer" may refer to a polymeric compound prepared by polymerizing monomers, whether of the same or a different type. The generic term "polymer" embraces the terms "homopolymer," "copolymer", and the like.

As used herein, the term "molecularly miscible" means a compound or mixture of compounds that exhibit properties in the bulk state that can be observed and/or measured by one of ordinary skill in the art and are indicative of single phase behavior or a single phase polymer. The term "single phase behavior" refers to behavior or physical properties that are uniform or substantially so. With respect to the acrylic copolymer, the observation of a single Tg is indicative of polymer segment miscibility. The single Tg is intermediate between those of the constituent polymer segments and varies monotonically between these values as the relative amounts of each segment changes. In contrast to single phase behavior evidenced by a molecularly miscible compound or mixture of compounds, at a given temperature, a phase separated compound demonstrates multiple, independent sets of properties that are attributable to the different phases of matter present therein. Such sets of properties include, without limitation, Tg, solubility parameters, refractive index, and physical state/phase of matter. Accordingly, the term "phase separated" is defined as two or more substances which are molecularly segregated due to one or more chemical and/or physical properties dependent upon, without limitation, polarity, molecular weight, relative amounts of the polymer segments, and Tg (phase of matter).

Evidence of immiscibility/incompatibility between blocks/segments of a block copolymer, such as an ABA block copolymer, can be confirmed via rheological measurements such as Dynamic Mechanical Analysis (DMA) or Differential Scanning calorimetry (DSC) and the microstructure determined from microscopy. Miscible polymers exhibit no heterogeneity (i.e., are single phase polymers) in their microstructure. The degree of miscibility/compatibility of a polymer blend can be simply determined by measuring the glass transition temperature(s) in a DMA or DSC can. The presence of two Tgs indicates immiscibility, while the presence of only a single Tg indicates a miscible blend. For block copolymers with mutually incompatible blocks, the microdomains formed by the different blocks exhibit separate/different Tgs, and for incompatible block copolymers separate Tg values are also observed in the DMA and/or DSC plots. For example, for typical styrenic and acrylic ABA block copolymers, the hard A block and the soft B block have sufficiently different solubility parameters such that they are not thermodynamically compatible with each other. As a result, block copolymer-based adhesives have a unique microphase-separated morphology, where A blocks form a hard phase embedded in a soft, continuous phase composed of B blocks. That is, a result of the frequent immiscibility/incompatibility of the two types of blocks present in ABA block copolymers, block copolymers generally exhibit two distinct glass transitions (a DMA bimodal tan δ curve) at temperatures very close to those of the corresponding homopolymers. The presence of acid, however, in block copolymers such as P(MMA/MAA)-PBA-P (MMA/MAA) raises the Tg of the end block and also enhances the phase separation between the soft acrylate and the hard PMMA domains. Therefore, block copolymers can exhibit morphologies which range from two-phase segregated materials to single-phase homogeneous materials.

The acrylic polymers contemplated herein are architectured polymers formed via a controlled free-radical process including selecting monomers that form homogeneous (single phase) acrylic block copolymers as evidenced by the presence of a single Tg peak, indicative of a homogeneous (single phase) polymer prior to crosslinking.

As used herein, the term "homogeneous polymer" is a block copolymer having substantially one morphological phase in the same state. For example, a block copolymer of two or more segments where one segment is miscible with another segment is said to be homogeneous in the liquid state. Such morphology is determined using atomic force microscopy (AFM) or scanning electron microscopy (SEM). By miscible is meant that the block copolymer of two or more segments exhibits single-phase behavior for the glass transition temperature, e.g. the Tg would exist as a single, sharp transition temperature on a dynamic mechanical thermal analyzer (DMTA) trace of tan δ (the ratio of loss modulus to the storage modulus) versus temperature. By contrast, two separate transition temperatures would be observed for an immiscible block copolymer, typically corresponding to the temperatures for each of the individual segments of the block copolymer. Thus a block copolymer is miscible when there is one Tg indicated on the DMTA trace. A miscible block copolymer is homogeneous, while an immiscible block copolymer is heterogeneous.

In contrast, the term "heterogeneous polymer" means a block copolymer having two or more morphological phases in the same or different state. For example, a block copolymer of two segments where one segment forms discrete packets dispersed in a matrix of another segment is said to be heterogeneous. Also a heterogeneous polymer is defined to include co-continuous segments where the block copolymer components are separately visible, but it is unclear which is the continuous phase and which is the discontinuous phase. Such morphology is determined using scanning electron microscopy (SEM) or atomic force microscopy (AFM). By continuous phase is meant the matrix phase in a heterogeneous block copolymer. By discontinuous phase is meant the dispersed phase in a heterogeneous block copolymer.

DMA was performed on a TA Instruments AR2000 rheometer fitted with parallel plate clamps. 1.0 mm thick samples were placed in the clamp and annealed at 70° C. for 10 minutes to ensure good adhesion. The samples were then cooled to −60° C. to begin a temp sweep to 150° C. at a ramp rate of 3° C./min. During the temp ramp, the samples were oscillated at a frequency of 10 rad/sec.

Representative and non-limiting examples of ranges of glass transition temperatures (Tg) for the precursor, the acrylic block copolymers, and/or pressure sensitive adhesives of the present subject matter are from about 15° C. to about −115° C., or from about 0° C. to about −80° C., and/or from about −35° C. to about −60° C.

The present subject matter builds on work with controlled architecture polymers (CAPs) described in the commonly-owned applications US 2011/0118372 A1, US 2013/0059971 A1, and US 2014/0329958 A1, the contents of which are herein incorporated by reference in their entirety. Additional details of the controlled architecture polymers including their syntheses are described in the noted commonly-owned patent applications.

The present subject matter relates to forming adhesives which can be activated or crosslinked upon exposure to actinic radiation. The adhesives include controlled architecture polymers (referred to as "CAPs" or acrylic block copolymer herein) which include one or more functional groups along the polymer backbone which upon such exposure effect crosslinking or other activation. The terms "CAPs" and "acrylic block copolymer" are used interchangeably herein. The present subject matter also relates to the adhesives including such CAPs with the noted functional groups. The present subject matter also relates to articles containing the adhesives prepared by the methods described herein. In addition, the present subject matter relates to equipment and systems for preparing and/or processing the adhesives and pre-adhesives.

Before turning attention to the details of the present subject matter and the numerous embodiments thereof, it is instructive to consider several terms and their definitions as used herein. The terms "polymerize" or "polymerizing" refer to a process of reacting monomers together in a chemical reaction to form polymer. And the terms "crosslink" or "crosslinking" refer to a process of forming bonds that link one polymer chain to another polymer chain. The bonds may be covalent bonds or ionic bonds. The term "crosslink" can refer to the bond itself. The terms "cure" and "curing" refer to the terms "crosslink" or "crosslinking" and are used interchangeably.

In many embodiments of the present subject matter methods, upon modifying functional groups of polymers and crosslinking of certain compositions, and particularly those that include CAPs, the resulting adhesives exhibit enhanced adhesive properties such as relatively high peel strength and shear strength. These enhanced adhesive properties are believed to at least partially result from (i) a majority of crosslinking involving functional group(s) of the polymers being located at or near terminal ends of the polymer chains, and (ii) an absence or only a minority of crosslinking involving functional group(s) located within interior regions of the polymer chains. The crosslinked network that results from the methods as described herein is referred to herein as an "enhanced terminally linked network" or ETLN. As described in greater detail herein, formation of an ETLN allows for lower adhesive coat weights, lower viscosities, and better adhesive performance, among various other advantages and benefits. These and other aspects of the methods, the CAP based adhesives and ETLNs, and related articles are described in greater detail herein.

Although in many embodiments, the present subject matter methods utilize adhesives including CAPs, it will be appreciated that the present subject matter also includes methods of modifying and crosslinking non-CAP based adhesives. These and other aspects of the methods, the non-CAP based adhesives modified and crosslinked by such methods, and related articles are described in greater detail herein.

Generally, the present subject matter provides a composition comprising, consisting essentially of, or consisting of a precursor and a reacting agent. The precursor comprising at least one acrylic block copolymer (also referred to as CAPs), the at least one acrylic block copolymer comprising (i) a first reactive segment of controlled molecular weight and position that comprises at least one monomer having a functional group selected from the group consisting of a self-reactive functional group, a reactive functional group, a non-reactive functional group, and combinations thereof and (ii) a second segment of controlled molecular weight and position that includes at least one monomer having a functional group selected from the group consisting of a reactive functional group, a non-reactive functional group, and combinations thereof. The reactive functionalities in the first reactive segment and the second segment may be the same or different from one another. The non-reactive functionalities in the first reactive segment and the second segment may be the same or different from one another. At least one of the functional groups of the at least one acrylic block copolymer can undergo a post-polymerization functionalization reaction with the reacting agent to make the at least one acrylic block copolymer crosslinkable upon exposure to an actinic radiation. The at least one acrylic block copolymer is not crosslinkable upon exposure to the actinic radiation prior to the post-polymerization functionalization reaction. Notably, (i) the at least one acrylic block copolymer does not contain ethylenic unsaturation along the polymer backbone and/or pendant groups, (ii) the reacting agent comprises at least one of a double bond and a functional group, the functional group being capable of reacting with at least one of the functional group of the at least one acrylic block copolymer, (iii) the post-polymerization functionalization reaction is an acrylation reaction, and (iv) the post-polymerization functionalization reaction produces a n ethylenically unsaturated bond on the at least one acrylic block copolymer, the ethylenically unsaturated bond being a double bond. The precursor forms a pre-adhesive composition after the post-polymerization functionalization reaction of the at least one acrylic block copolymer and the said pre-adhesive is at least partially crosslinkable upon exposure to the actinic radiation to form an adhesive. The adhesive formed may be a pressure sensitive adhesive. The actinic radiation is at least one of UV radiation and electron beam radiation.

The first reactive segment and second segment are defined by (i) the type of monomers (i.e., self-reactive, reactive, and non-reactive monomers) present in the particular segment and (ii) the ratio of the non-reactive monomers in each segment. The precursor described herein comprises, consists essentially of, or consists of, amongst other features, a triblock acrylic copolymer having a $\{(A)(B)(C)\}$-$\{(B)(C)\}$-$\{(C)(B)(A)\}$ structure or a $\{(A)(B)(C)\}$-$\{(C)\}$-$\{(C)(B)(A)\}$ structure, or a $\{(A)(C)\}$-$\{(C)\}$-$\{(C)(A)\}$ structure, or a $\{(B)(C)\}$-$\{(C)\}$-$\{(C)(B)\}$ structure, where A represents the at least one monomer having a self-reactive functional group, B represents the at least one monomer having a reactive functional group, and C represents the at least one monomer having a non-reactive functional group. And $\{(A)(B)(C)\}$, $\{(A)(C)\}$, and $\{(B)(C)\}$ represent the first reactive segment(s) while $\{(B)(C)\}$ and $\{(C)\}$ represent the second segment(s). That is, the first reactive segment(s) comprises or consists of a monomer having a self-reactive functional group, a monomer having a reactive monomer, and a non-reactive monomer or the first reactive segment(s) comprises or consists of a monomer having a self-reactive functional group, and a monomer having a non-reactive functional group, or the first reactive segment(s) comprises or consists of a monomer having a reactive functional group, and a monomer having a non-reactive functional group, while the second reactive segment comprises or consists of a monomer having a reactive functional group and a monomer having a non-reactive functional group or the second reactive segment comprises or consists of only a monomer having a non-reactive functional group. The at least one monomer having a reactive functional group in the first reactive segment and the at least one monomer having a reactive functional group in the second segment may be the same type of monomer(s) or different type of monomer(s). The at least one monomer having a non-reactive functional group in the first reactive segment and the at least one monomer having a non-reactive functional group in the second segment may be the same type of monomer(s) or different type of monomer(s). The first reactive segment(s) comprise about 40% to about 99%, or about 45% to about 99%, or about 50% to about 99%, or about 55% to about 99%, or about 60% to about 99%, or about 65% to about 99%, or about 70% to about 99%, or about 75% to about 99%, or about 80% to about 99%, or about 85% to about 99%, or about 90% to about 99%, or about 95% to about 99% by weight of one or more non-reactive monomers. The first reactive segment(s) comprises about 40% to about 99%, or about 45% to about 99%, or about 50% to about 99%, or about 55% to about 99%, or about 60% to about 99%, or about 65% to about 99%, or about 70% to about 99%, or about 75% to about 99%, or about 80% to about 99%, or about 85% to about 99%, or about 90% to about 99%, or about 95% to about 99% by weight of one or more monomers of the second reactive segment.

The precursor described herein comprises, consists essentially of, or consists of, amongst other features, a diblock acrylic copolymer having a {(A)(B)(C)}-{(B)(C)} structure or a {(A)(C)}-{(C)} structure or a {(B)(C)}-{(C)}, where A represents the at least one monomer having a self-reactive functional group, B represents the at least one monomer having a reactive functional group, and C represents the at least one monomer having a non-reactive functional group. And {(A)(B)(C)} and {(A)(C)}, and {(B)(C)} represent the first reactive segment(s) while {(B)(C)} and {(C)} represent the second segment(s). That is, the first reactive segment(s) comprises or consists of a monomer having a self-reactive functional group, a monomer having a reactive functional group, and a monomer having a non-reactive functional group or the first reactive segment(s) comprises or consists of a monomer having a self-reactive functional group and a monomer having a non-reactive functional group or the first reactive segment(s) comprises or consists of a monomer having a reactive functional group and a monomer having a non-reactive functional group, while the second segment comprises or consists of a monomer having a reactive functional group and a monomer having a non-reactive functional group or the second segment comprises or consists of only a monomer having a non-reactive functional group. The at least one monomer having a reactive functional group in the first reactive segment and the at least one monomer having a reactive functional group in the second segment may be the same type of monomer(s) or different type of monomer(s). The at least one monomer having a non-reactive functional group in the first reactive segment and the at least one monomer having a non-reactive functional group in the second segment may be the same type of monomer(s) or different type of monomer(s). The first reactive segment(s) include about 40% to about 99%, or about 45% to about 99%, or about 50% to about 99%, or about 55% to about 99%, or about 60% to about 99%, or about 65% to about 99%, or about 70% to about 99%, or about 75% to about 99%, or about 80% to about 99%, or about 85% to about 99%, or about 90% to about 99%, or about 95% to about 99% by weight of one or more non-reactive monomers. The first reactive segment(s) include about 40% to about 99%, or about 45% to about 99%, or about 50% to about 99%, or about 55% to about 99%, or about 60% to about 99%, or about 65% to about 99%, or about 70% to about 99%, or about 75% to about 99%, or about 80% to about 99%, or about 85% to about 99%, or about 90% to about 99%, or about 95% to about 99% by weight of one or more monomers of the second segment. The term "reactive functional group" refers to a functional group that is capable of reacting with another functional group. The term "self-reactive functional group" refers to a functional group that is capable of reacting with (i) an identical second self-reactive functional group, (ii) with a different second self-reactive functional group and/or (iii) with a reactive functional group. That is, the self-reactive functional group can react with another identical self-reactive functional group, with another self-reactive functional group that is different, and/or with a reactive functional group. Self-reactive functional groups are capable of polymerizing with themselves. Non-limiting examples of self-reactive functional group is selected from the group consisting of silyl, silane, anhydride, epoxy, alkoxymethylol, cyclic ethers, acetoacetyl groups, isocyanate, cyclic esters, and mercapto (thiol). Non-limiting examples of the reactive functional group is selected from the group consisting of hydroxyl, carboxyl, carbonyl, carbonate ester, isocyanate, epoxy, vinyl, amine, amide, imide, anhydride, mercapto (thiol), acid, acrylamide, acetoacetyl groups, alkoxymethylol, cyclic ether groups, and combinations thereof.

Controlled Architecture Polymers (CAPs)

In particular embodiments, the actinic radiation curable and crosslinkable adhesives of the present subject matter are produced from controlled architecture polymers. In many embodiments the polymers are acrylic polymers.

In many embodiments of the present subject matter, the actinic radiation curable and crosslinkable adhesives that include controlled architecture polymers have one or more reactive functional groups incorporated in select blocks or regions of the polymer at designated concentrations within those regions. As noted, in many embodiments the polymers are acrylic polymers.

The polymerizable monomers and comonomers contemplated herein can include as reactive functional groups acrylonitrile groups, acrylamide groups, methacrylamide groups, vinyl ester groups, vinyl ether groups, vinyl amide groups, vinyl ketone groups, styrene groups, halogen-containing groups, ionic groups, acid-containing groups, base-containing groups, olefin groups, silane groups, epoxy groups, hydroxyl groups, anhydride groups, and mixtures of two or more groups thereof. It is also contemplated to include silyl groups, carboxyl groups, carbonyl groups, carbonate ester groups, isocyanato groups, amino groups, amide groups, imide groups, mercapto groups, and acetoacetyl groups in any combination and/or in combination with one or more of any of the previously noted groups.

The acrylonitrile groups can include acrylonitrile and alkyl substituted acrylonitriles. The alkyl groups typically contain from 1 to about 20 carbon atoms, and in one embodiment from 1 to about 10 carbon atoms, and in another embodiment from 1 to about 5 carbon atoms. Examples include methacrylonitrile and ethacrylonitrile.

The acrylamide groups can include acrylamide and its derivatives including the N-substituted alkyl and aryl derivatives thereof. These include N-methyl acrylamide, N,N-dimethyl acrylamide, t-octyl acrylamide, N-aminoethyl acrylate, N-aminoethyl methacrylate, and the like.

The methacrylamide groups can include methacrylamide and its derivatives including the N-substituted alkyl and aryl derivatives thereof.

The vinyl ester groups can include vinyl acetate, vinyl propionate, vinyl butyrate, vinyl valerate, vinyl versitate, vinyl isobutyrate, and the like.

The vinyl ether groups can include vinyl ethers having 1 to about 8 carbon atoms including ethylvinyl ether, butylvinyl ether, 2-ethylhexylvinyl ether, and the like.

The vinyl amide groups can include vinyl amides having 1 to about 8 carbon atoms including vinyl pyrrolidone, and the like.

The vinyl ketone groups can include vinyl ketones having 1 to about 8 carbon atoms including ethylvinyl ketone, butylvinyl ketone, and the like.

The styrene groups can include styrene, indene, and substituted styrenes represented by the formula (I):

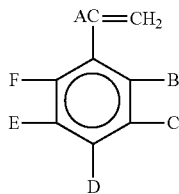
(I)

wherein each of A, B, C, D, E and F is independently selected from hydrogen, C1 to about C4 alkyl or alkoxy groups (especially methyl or methoxy groups,) halogroups (especially chloro), thio, cyano, carboxylic acid or ester, or fluorinated alkyl groups of 1 to about 4 carbon atoms. Examples include methyl styrene (sometimes referred to as vinyl toluene), alpha-methyl styrene, divinylbenzene, chlorostyrene, chloromethyl styrene, and the like.

The halogen-containing groups can include vinyl chloride, vinyl bromide, vinyl fluoride, vinylidene chloride, vinylidene bromide, vinylidene fluoride, halogen substituted propylene monomers, and the like, with vinyl bromide and vinylidene chloride being preferred.

The ionic groups can include sodium vinyl sulfonate, sodium styrene sulfonate, sodium methallyl sulfonate, sodium acrylate, sodium methacrylate, and the like, with sodium vinyl sulfonate, sodium styrene sulfonate and sodium methallyl sulfonate being preferred.

The acid-containing groups can include unsaturated carboxylic acids containing from 3 to about 20 carbon atoms. Preferred groups include acrylic acid, methacrylic acid, vinyl sulfonic acid, itaconic acid, beta carboxyl ethyl acrylate, mono-2-acroyloxypropyl succinate, and the like.

The base-containing groups can include vinyl pyridine and the like.

The olefin groups can include isoprene, butadiene, C2 to about C8 straight chained and branched alpha-olefins such as ethylene, propylene, butylene, isobutylene, diisobutylene, 4-methyl pentene-1,1-butene, 1-hexene, 1-octene, and the like.

The silane groups can include vinyltrimethoxysilane, vinyltriethoxysilane, vinyltripropoxysilane, vinylmethyldimethoxysilane, vinylmethyldiethoxy-silane, vinylmethyldipropoxysilane, γ-methacryloxypropyl-trimethoxysilane, γ-methacryloxypropyltriethoxysilane, γ-methacryloxypropyl-tripropoxysilane, γ-methacryloxydimethoxysilane, γ-methacryloxypropyl-methyldimethoxysilane, γ-methacryloxypropylmethyldiethoxysilane, γ-methacryl-oxypropylmethyldipropoxysilane, γ-methacryloxymethyl-dimethoxysilane, γ-methacryloxymethyltrimethoxysilane, γ-methacryloxymethyl-triethoxy-silane, (methacryloxymethyl) methyldimethoxysilane, (methacryloxymethyl)-methyldiethoxysilane, γ-methacryloxypropyltriacetoxysilane, γ-acryloxypropyltrimethoxy-silane, γ-acryloxypropyltriethoxy-silane, γ-methacryl-oxymethyldiethoxysilane, γ-acryloxypropyltripropoxy-silane, γ-acryloxypropyl-methyldimethoxysilane, γ-acryloxypropylmethyldiethoxysilane, γ-acryloxypropyl-methyldipropoxysilane, and the like.

The epoxy groups can include for example, glycidyl methacrylate and glycidal acrylate.

The hydroxyl groups can include for example hydroxy ethyl acrylate, hydroxyl ethyl methacrylate, hydroxyl isopropyl acrylates, hydroxyl isopropyl methacrylate, hydroxyl butyl acrylate, hydroxyl butyl methacrylate and the like.

The anhydride groups can include for example maleic anhydride, itaconic anhydride, citraconic anhydride and the like.

In addition to the monomer having functional group(s), the reactive segment may include at least one monomer having the formula (II):

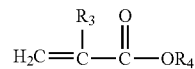
(II)

where $R_3$ is H or $CH_3$ and $R_4$ is a branched or unbranched, saturated alkyl group having 4 to 14 carbon atoms. The reactive segment may instead or additionally include at least one monomer having the formula (III):

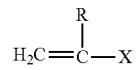
(III)

where R is H or $CH_3$ and X represents or contains a functional group capable of crosslinking.

Representative preferred reactive functional groups incorporated in the polymers described herein include, but are not limited to, acrylic acid, 2-methacryloxyethylphthalic acid (PAMA), and combinations thereof. It will be appreciated that a wide array of other reactive functional groups can be used instead of or in conjunction with any of these reactive functional groups.

Figure 2:
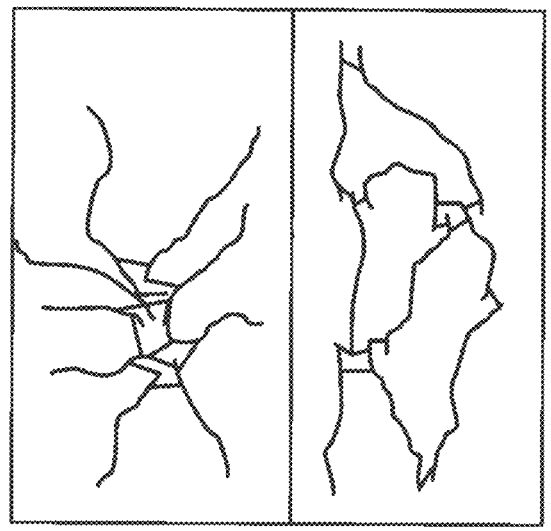
FIG. 2 is a schematic illustration depicting controlled architecture polymers (CAPs) and upon exposure to UV radiation, formation of enhanced terminally linked networks in accordance with the present subject matter.
Figure 2:
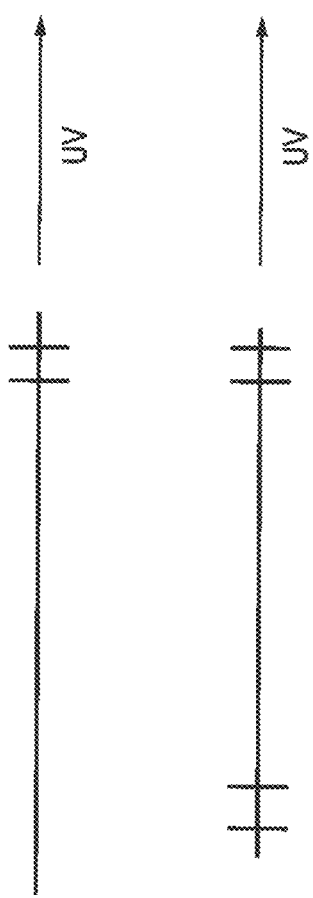

As previously noted, upon crosslinking of the present subject matter adhesives and formation of an enhanced terminally linked polymeric network, the resulting enhanced adhesive exhibits certain properties that are at least comparable to, and in many instances superior to, those of adhesives utilizing conventional randomly crosslinked polymeric networks. FIG. 1 is a schematic illustration depicting a conventional polymer including various reactive functional groups and upon exposure to UV radiation, formation of a conventional randomly crosslinked network. In FIG. 1, the various functional groups are schematically represented by the vertical line segments located along the polymer chain or backbone which is represented by the horizontal line segment. Upon crosslinking, crosslink bonds involve interior regions of the polymers as a result of many functional groups being located within those interior regions. FIG. 2 is a schematic illustration depicting controlled architecture polymers (CAPs) and upon exposure to UV radiation, formation of an enhanced terminally linked network in accordance with the present subject matter. The CAPs include various functional groups located primarily at or near terminal ends of the polymers. Thus, upon crosslinking, the network that forms is characterized by crosslink bonds primarily at terminal ends of the polymers, and an absence or a relatively minor extent of crosslink bonds involving interior regions of the polymers.

Figure 3:
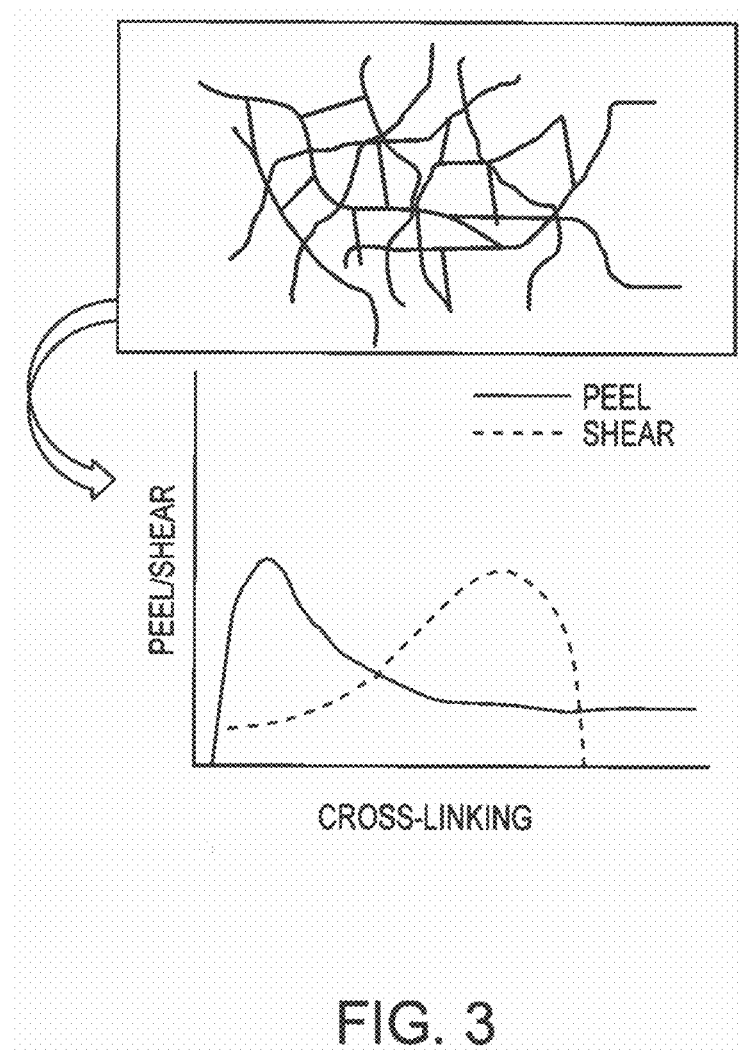
FIG. 3 is a schematic illustration of a conventional randomly crosslinked network and, upon incorporation in an adhesive, typical adhesive properties associated with such network.
Figure 4:
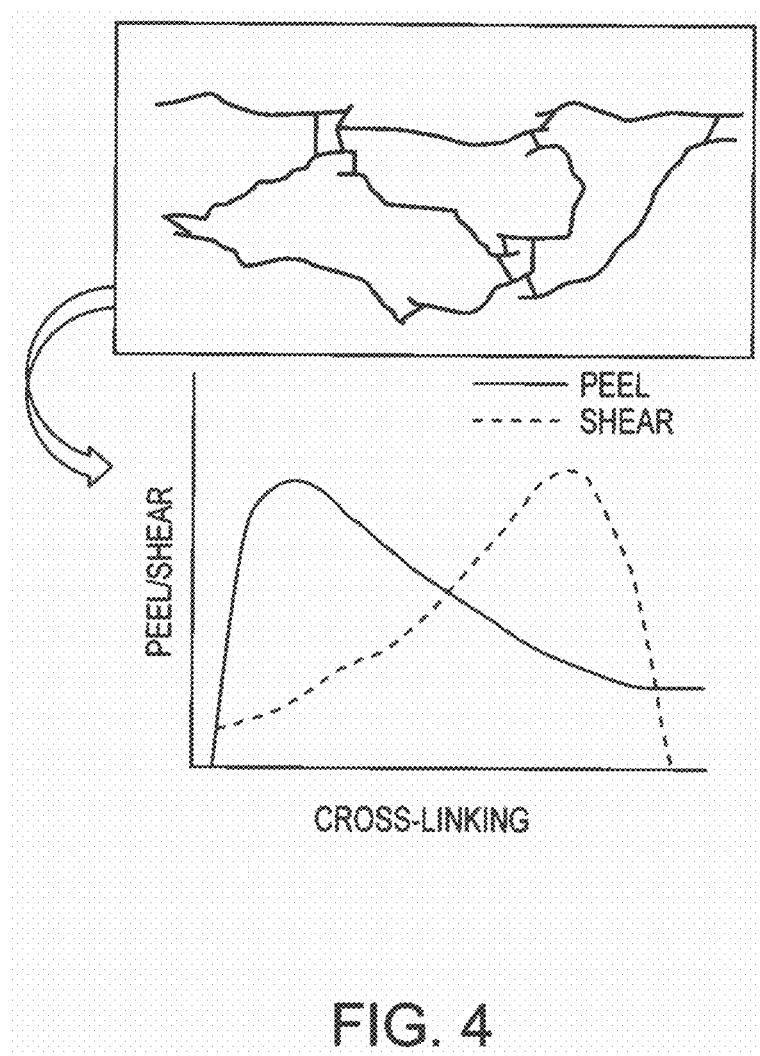
FIG. 4 is a schematic illustration of an enhanced terminally linked network and, upon incorporation in an adhesive, typical adhesive properties associated with such network in the adhesive in accordance with the present subject matter.

The resulting polymeric networks influence and in many regards determine physical properties of the resulting adhesives. FIG. 3 is a schematic illustration of a conventional randomly crosslinked network and, upon incorporation in an adhesive, typical adhesive properties associated with such network. FIG. 4 is a schematic illustration of an enhanced terminally linked network and, upon incorporation in an adhesive, typical adhesive properties associated with such network in the adhesive in accordance with the present subject matter. While the graphs in FIGS. 3 and 4 do not contain values on the y-axis, each graph is presented with the same scale. Accordingly, the networked polymer created though controlled architecture polymerization and depicted in FIG. 4 demonstrates both an improved peel strength (pounds per linear inch) and shear strength (minutes) when compared to the randomly crosslinked network depicted in FIG. 3.

Non-CAPs

In certain embodiments, the actinic radiation curable and crosslinkable adhesives of the present subject matter are produced from polymers that are not controlled architecture polymers, or as referred to herein as "non-CAPs." Such adhesives are free or substantially free of controlled architecture polymers.

In many applications involving non-CAP based adhesives, the polymers are acrylic or alkyl acrylate polymers.

The alkyl acrylates and alkyl methacrylates used in the present subject matter include straight chain alkyl groups, branched chain alkyl groups, or cyclic alkyl groups and, in many embodiments contain from 1 to about 24 carbon atoms. In particular embodiments, the alkyl group contains from 1 to about 12 carbon atoms.

In a particular embodiment, the alkyl acrylate or alkyl methacrylate monomers have from about 4 to about 8 carbon atoms. Such monomers are generally commercially available as commodity chemicals and are less expensive than longer chain alkyl acrylates and methacrylates. They also tend to yield copolymers having a good balance of tack and peel.

A representative, but nonlimiting list of alkyl acrylates and alkyl methacrylates useful in the practice of the present subject matter includes methyl acrylate, ethyl acrylate, n-propyl acrylate, isopropyl acrylate, n-butyl acrylate, isobutyl acrylate, n-amyl acrylate, isoamyl acrylate, n-hexyl acrylate, isohexyl acrylate, cyclohexyl acrylate, isooctyl acrylate, 2-ethylhexyl acrylate, decyl acrylate, lauryl acrylate, stearyl acrylate, isobornyl acrylate, and mixtures thereof, as well as the analogous methacrylate monomers. It will be appreciated, however, that alkyl methacrylates generally yield copolymers having higher Tg's than their alkyl acrylate counterparts. Therefore, when alkyl methacrylates are used, they are employed in small quantities only. As a general rule of thumb, the alkyl methacrylates comprise no more than about 15% of the total weight of all monomers.

The non-CAP polymer(s) include one or more reactive functional groups as described herein in association with the CAPs. However, the one or more reactive functional groups can be present along the polymer chain or backbone in a non-structured or random or non-ordered manner.

Representative and non-limiting examples of ranges of glass transition temperatures (Tg) for the non-CAP polymers typically are from about −60° C. to about −35° C. However, it will be appreciated that the polymers of the present subject matter can exhibit Tg's outside of this range such as less than −60° C. and/or greater than −35° C.

It is also contemplated that the present subject matter may include combinations or blends of CAPs and non-CAPs.

Pre-Adhesives and Adhesives

After modification of functional groups in the polymers to render the groups actinic radiation-activatable and more particularly UV-activatable, the polymers can be incorporated into adhesive and/or pre-adhesive compositions.

As previously noted, the present subject matter provides pre-adhesive compositions that upon activation, undergo crosslinking to produce an adhesive having particular properties and/or characteristics. In many embodiments, the pre-adhesive compositions include CAPs that upon activation, undergo crosslinking to produce an adhesive having certain properties and/or characteristics.

More specifically, in many embodiments, the actinic radiation activatable and crosslinkable adhesives include controlled architecture polymers or CAPs. In many embodiments of the present subject matter, the CAPs are those described in one or more co-pending applications owned by the Applicant which include US 2011/0118372; US 2013/0059971; and US 2014/0329958. Details of particular embodiment polymers are provided herein. However, it will be understood that the present subject matter includes the use of any of the polymers described in these applications.

In certain embodiments, at least one of the precursor and the pre-adhesive described above exhibits a viscosity within a range of from 1,000 cps to 80,000 cps at a temperature within a range of from 110° C. to 180° C. In particular embodiments, at least one of the precursor and the pre-adhesive exhibits a viscosity within a range of from 30,000 cps to 40,000 cps at a temperature within a range of from 120° C. to 140° C. In other embodiments, at least one of the precursor and the pre-adhesive exhibits a viscosity within a range of from 40,000 cps to 50,000 cps at a temperature within a range of from 120° C. to 140° C. And, in still other embodiments, at least one of the precursor and the pre-adhesive exhibits a viscosity within a range of from 1,000 cps to 15,000 cps at a temperature within a range of from 110° C. to 130° C.

It will be understood that in no manner is the present subject matter limited to adhesives or pre-adhesives exhibiting these particular viscosities. It is contemplated that the present subject matter may also include at least one of the precursor and pre-adhesives exhibiting these viscosities at temperatures less than 110° C., and/or at temperatures greater than 180° C. Moreover, it is contemplated that the present subject matter may also provide at least one of the precursor and pre-adhesives that exhibit viscosities less than 1,000 cps and/or greater than 80,000 cps at a wide array of temperatures.

In certain embodiments, the present subject matter adhesives and/or pre-adhesive compositions may comprise one or more actinic radiation initiators. Although not wishing to be bound by any particular theory, it is believed that in many embodiments of the present subject matter, the initiator(s), when irradiated with actinic radiation and particularly UV light, is excited to a higher energy state and abstracts a hydrogen atom from a functional group on the polymer, thereby generating a free radical that is available for further reaction, such as for example free radical addition crosslinking with another polymer chain or functional group on the polymer. However, it will be understood that the present subject matter includes the use of nearly any type of initiator and is not limited to those that abstract hydrogen atoms. For example, a variety of initiators are known that decompose or cleave into free radicals upon exposure to light, and more particularly UV radiation.

A variety of initiators are known and can potentially be incorporated in the present subject matter adhesives and pre-adhesives, including benzophenone, acetophenone, acyl phosphine, thioxanthone, derivatives of these compounds, and similar compounds. Each compound functions as a photoinitiator by absorbing energy within the UV region of the electromagnetic spectrum.

Several types of photoinitiators that absorb in the near UV region of the spectrum are known, including acylphosphine oxide-type photoinitiators, redshifted benzophenone-type photoinitiators, and thioxanthone-type photoinitiators. Many of these may be suitable for use with the present subject matter compositions.

Commercially available acylphosphine oxide-type photoinitiators include "Lucirin TPO" (2,4,6-trimethylbenzoyl-diphenylphosphine oxide) and "Lucirin TPO-L" (liquid), sold by BASF, and "BAPO" (bis 2,6-dimethoxybenzoyl-2,4-trimethylpentylphosphine oxide), sold by Ciba.

The so-called "redshifted benzophenone-type photoinitiators" are benzophenone derivatives in which one or more hydrogen atoms is replaced by a functional group or groups which cause a redshift (towards longer wavelengths) in the UV absorption spectrum of the molecule, as compared to the UV absorption spectrum of benzophenone. An example is "QUANTACURE BMS" (4-benzoyl-4'-methyldiphenylsulfide).

Commercially available thioxanthone-type photoinitiators include "Quantacure ITX," which is believed to be a mixture of 2-isopropyl- and 4-isopropylthioxanthone isomers.

Other suitable photoinitiators can be identified by those skilled in the art and utilized in the present subject matter. Moreover, if the adhesive is compounded without a pigment, photoinitiators that absorb at shorter UV wavelengths can be employed, including less expensive, simpler photoinitiators such as unsubstituted acetophenone, benzil, benzophenone, quinone, and thioxanthone.

The total amount of initiators added to the polymer in preparing the adhesive or pre-adhesive depends on several factors, including the amount of pigment and/or other agents added, the coat weight (thickness) of the adhesive on the substrate, the web speed during curing, and the type and cost of the initiators used. In many embodiments, the initiator is the most expensive ingredient in the adhesive. Therefore, ordinarily it is desirable to minimize the amount of initiator added to the polymer, so long as enough initiator is included to achieve the desired end properties of the resulting composition.

In certain embodiments of the present subject matter, a pigment or other coloring agent(s) is added to the composition, typically prior to crosslinking, in order to render the adhesive opaque, and/or to impart color to the adhesive. Opaque pigments such as for example titanium dioxide typically are added by the coating industry precisely because of their high hiding power. However, their presence generally interferes with UV initiated crosslinking of the adhesive polymer. In the present subject matter, however, initiators that absorb in the near UV region of the spectrum can be employed with pigmented (as well as non-pigmented) formulations, thereby avoiding interference with UV initiated crosslinking of the adhesive.

The amount of pigment added to the compounded polymer in a given formulation, like the amount of initiator, depends on a number of factors, including the desired degree of opacity, desired degree of cure, whether other fillers are present, the type and amount of photoinitiator present, and cost considerations.

For the present subject matter, where pigmented adhesive or pre-adhesive compositions are utilized, UV initiated crosslinking can be facilitated by decreasing the amount of titanium dioxide present (or other pigment) and/or increasing the amount of initiator. As a practical matter, though, pigment loadings above about 15 parts pigment per hundred parts polymer (or, if the copolymer is tackified, about 15 parts pigment per 100 parts polymer plus tackifier) are less preferred than lower pigment loadings. UV initiated crosslinked, pressure sensitive adhesive compositions having high cohesive strength can be prepared in accordance with the present subject matter with higher pigment loadings, but require higher (and more expensive) initiator concentrations and/or longer crosslinking times.

In some embodiments, the adhesive or pre-adhesive composition is formulated with a colored (non-white) pigment.

Generally, yellow and red pigments do not substantially interfere with photoinitiators that absorb in the UV region. Hence, adhesives compounded with such pigments can be UV crosslinked to a high cohesive strength by using UV-activatable, photoinitiators. Blue pigments tend to absorb strongly in at least part of the near UV region. By minimizing the amount of blue pigment that is added, however, UV crosslinked adhesives can be prepared in the manner described herein.

In addition to the pigment and initiator(s), in some embodiments, the adhesive or pre-adhesive is further compounded with a tackifier. In certain embodiments such as if the adhesive is a pressure sensitive adhesive, tackifier may be added to improve the tack of the pressure sensitive adhesive.

A variety of tackifiers, many of which are well known in the industry, can potentially be used in the practice of the present subject matter. Representative, nonlimiting examples of such tackifiers include hydrocarbon resins and rosin resins. Such tackifiers include, but are not limited to, rosins and rosin derivatives including rosinous materials that occur naturally in the oleoresin of pine trees, as well as derivatives thereof including rosin esters, modified rosins such as fractionated, hydrogenated, dehydrogenated, and polymerized rosins, modified rosin esters and the like. Generally, up to about 45 parts tackifier per hundred parts polymer are added. However, it will be appreciated that the present subject matter includes the use of lesser amounts and/or greater amounts of tackifiers.

A wide range of tackifiers are commercially available including, but not limited to, Foral® 85 (glycerol ester of a highly stabilized rosin), Foral® 105 (pentaerythritol ester of a hydrogenated rosin), Stabilite ester 10, and Pentalyn® H, manufactured and sold by Hercules, Inc., PE Estergum and the like, manufactured by Arizona Chemical Co., and Sylvatac® 40N, Sylvatac® RX, Sylvatac® 95 and the like, manufactured by Sylvachem Corporation.

There may also be employed as tackifiers terpene resins which are hydrocarbons of the formula C10H16, occurring in most essential oils and oleoresins of plants, and phenol modified terpene resins like alpha pinene, beta pinene, dipentene, limonene, myrecene, bornylene, camphene, and the like. Various aliphatic hydrocarbon resins like Escorez™ 1304, manufactured by Exxon Chemical Co., and aromatic hydrocarbon resins based on C9's, C5's, dicyclopentadiene, coumarone, indene, styrene, substituted styrenes and styrene derivatives and the like can also be used.

Hydrogenated and partially hydrogenated resins such as Regalrez™ 1018, Regalrez™ 1033, Regalrez™ 1078, Regalrez™ 1094, Regalrez™ 1126, Regalrez™ 3102, Regalrez™ 6108, etc., produced by Hercules Corporation, can be used as tackifiers in the present subject matter as well. Various terpene phenolic resins of the type SP 560, manufactured and sold by Schenectady Chemical Inc., Nirez 1100, manufactured and sold by Reichold Chemical Inc., and Piccolyte® S-100, manufactured and sold by Hercules Corporation, are particularly useful tackifiers for the present subject matter. Further, various mixed aliphatic and aromatic resins, such as Hercotex AD 1100, manufactured and sold by Hercules Corporation, can also be used as tackifiers.

Additionally, the actinic radiation curable and crosslinkable adhesive compositions may comprise one or more inhibitors. A viable free radical scavenger may be present to prevent premature gelation, either in storage or preparation for coating, especially in the case of hot melt adhesive compositions. Inhibitors comprising phenolic compounds are one class of such materials that may be used in the present subject matter, including, for example, 4-methoxyphenol (MEHQ, methyl ether of hydroquinone), hydroquinone, 2-methylhydroquinone, 2-t-butylhydroquinone, t-butyl catechol, butylated hydroxy toluene, and butylated hydroxy anisole and the like and combinations thereof. Other inhibitors that may be used include phenothiazine and anaerobic inhibitors, such as the NPAL type inhibitors (tris-(N-nitroso-N-phenylhydroxylamine) aluminum salt) from Albemarle Corporation, Baton Rouge, La. Combinations of inhibitors may be used.

The adhesives or pre-adhesives of the present subject matter may further comprise one or more conventional adjuvants such as fillers, plasticizers, diluents, and the like. Combinations of one or more of these components can be used including combinations with pigment(s) and/or tackifier(s). If desired, diluents such as plasticizers may be added in the place of a portion of the tackifier in order to alter the properties of tackiness and cohesive strength.

Generally, the actinic radiation curable and crosslinkable adhesives include at least 95% solids, in many embodiments at least 98% solids, in particular embodiments at least 99% solids, and in certain versions at least 99.5% solids.

In many embodiments, the adhesives are in the form of melt processable or hot melt adhesives, as known in the art. These adhesives are free or substantially free of solvents.

In many embodiments of the present subject matter the adhesives are in the form of pressure sensitive adhesives. A description of pressure sensitive adhesives and their characteristics may be found in Encyclopedia of Polymer Science and Engineering, Vol. 13. Wiley-Interscience Publishers (New York, 1988). Additional description of pressure sensitive adhesives and their characteristics may be found in Encyclopedia of Polymer Science and Technology, Vol. 1, Interscience Publishers (New York, 1964).

Methods

The present subject matter also provides methods of modifying functional groups located along a polymer backbone into actinic radiation-activatable and more particularly UV-activatable groups. The methods generally comprise providing controlled architecture polymers having one or more functional groups located along a backbone of the polymer. The methods also comprise modifying at least a portion of the functional groups to produce ethylenically unsaturated bonds that upon exposure to actinic radiation, effect curing of the pre-adhesive composition to thereby produce an adhesive composition.

The noted modification can occur by one or more steps or operations in which the functional group(s) is reacted with one or more reagents to produce the ethylenically unsaturated bonds.

The present subject matter also provides methods of forming an adhesive composition. The methods involve providing a pre-adhesive composition including controlled architecture polymers having one or more functional groups located along a backbone of the polymer. At least a portion of the functional groups include ethylenically unsaturated bonds. The methods also involve exposing the pre-adhesive composition to actinic radiation to thereby at least partially cure the pre-adhesive composition and form the adhesive.

The present subject matter adhesives or compositions are cured and/or crosslinked by exposure to actinic radiation, and particularly ultraviolet (UV) radiation or near UV radiation. Electron beam radiation can also be used. As will be appreciated, sufficient exposure to such radiation causes curing and/or crosslinking involving various functional groups incorporated in the polymers and in certain embodiments the CAPs.

Use of the aspects described herein enable formation of a pre-adhesive or adhesive formulation that can be further processed by subsequent or additional exposure to actinic radiation and particularly UV radiation. Thus, an initial batch or a desired amount of pre-adhesive or adhesive can be crosslinked or at least partially crosslinked in bulk and then stored or held for later application or coating to a substrate of interest.

After the adhesive is coated on a substrate at a desired coat weight, the coated substrate is irradiated with actinic radiation and particularly UV radiation to yield a crosslinked adhesive and in many embodiments a pressure sensitive adhesive having high cohesive strength at room and elevated temperatures. A variety of UV light sources are known, including low, high, and medium pressure mercury lamps, which emit over a wide range of wavelengths. Most pigmented and unpigmented adhesives can be readily cured using a medium pressure mercury lamp, which has emission bands ranging from about 240 to about 410 nanometers. Alternatively, UV sources that emit over a more narrow range of wavelengths can be used if desired, so long as the emission spectrum of the source overlaps with the absorption spectrum of the modified functional groups having ethylenically unsaturated bonds and/or initiator(s) employed within the adhesive.

Figure 5:
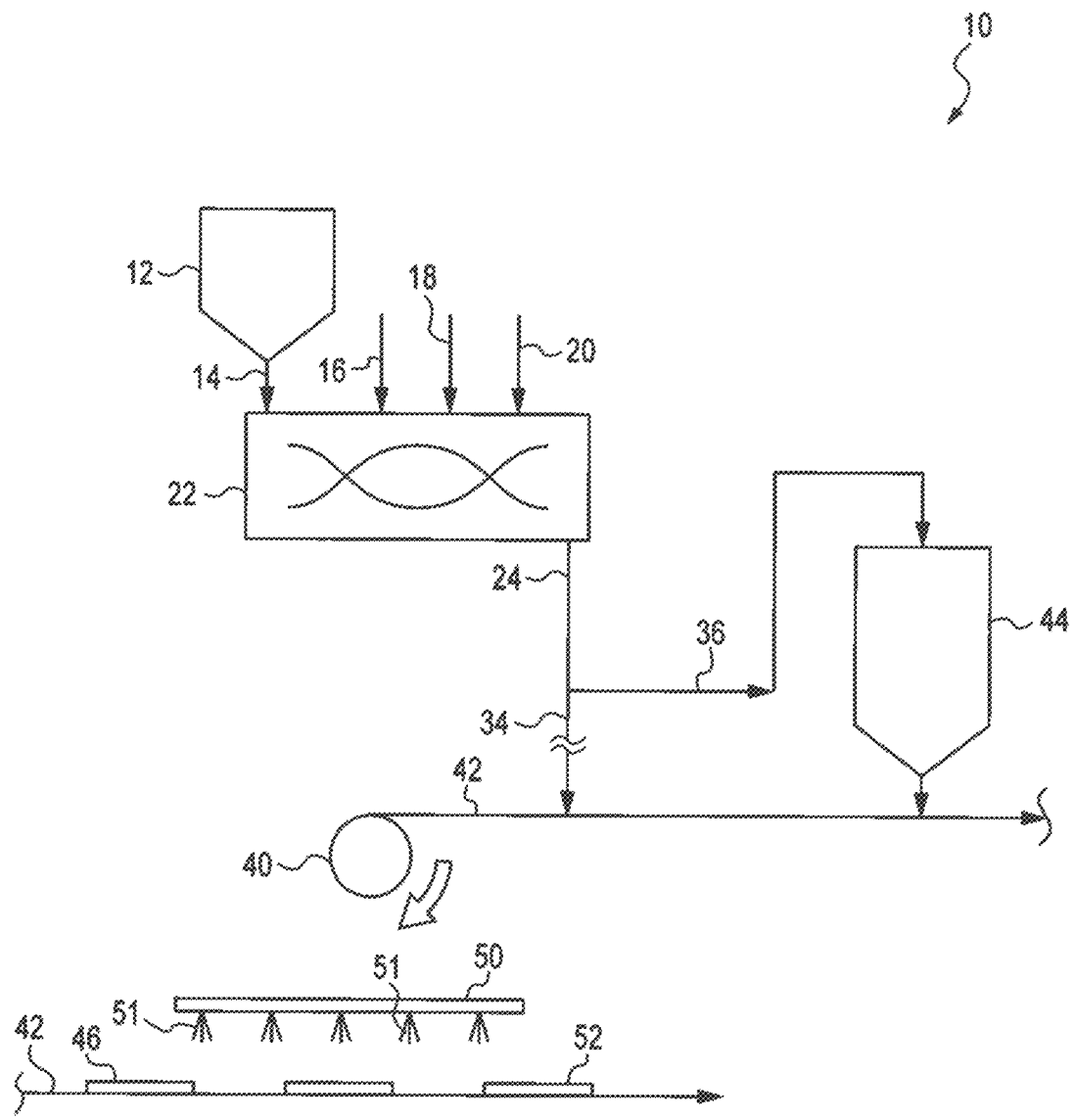
FIG. 5 is a process schematic diagram showing a representative process and system for producing an adhesive in accordance with the present subject matter.

FIG. 5 is a process schematic diagram depicting a representative process and system 10 for producing an adhesive and curing and crosslinking the adhesive in accordance with the present subject matter. The system 10 generally comprises a dispenser or heater 12 for introducing one or more polymers and/or other components via feed line 14 to a reactor, blender or mixer 22. The polymers are typically CAPs and include one or more functional groups along the polymer backbone as described herein. Also provided are additional feed lines 16, 18, and 20 which can be for selectively metering desired amounts of reagent(s), initiator(s), and ancillary components or other additives to the reactor/mixer 22.

After reaction between functional group(s) located along the polymer backbone with reagent(s) to form actinic radiation-activatable and more particularly UV-activatable groups, the resulting pre-adhesive is directed through line 24.

The adhesive in line 24 may be directly deposited or applied to one or more substrates on a moving web 42 (typically driven by rotating roller 40) via line 34, or directed via line 36 to a storage unit 44 for additional processing and/or subsequent application.

Upon deposition of the adhesive shown in FIG. 5 as regions 46, the adhesive typically on the moving web 42, is irradiated by a source of actinic radiation such as a UV emitter in a stage 50 that directs UV rays 51 upon the regions 46 to crosslink the adhesive. Crosslinked adhesive 52 results.

In particular embodiments, one or more conventional medium pressure mercury lamps can be used having spectral emissions from about 240 to about 410 nanometers, and light intensities of from about 5 to 10 kWatts/m². Nonlimiting examples of UV light intensities for processing adhesives of the present subject matter can range from about 0.1 to about 100 kWatts/m², in certain embodiments from 1 to 50 kWatts/m², and in particular embodiments from 1 to 20 kWatts/m². The coated substrate is carried on a moving web under or near the UV radiation source, where the web temperature may range from 45° C. to 125° C. The dosage of UV radiation received by the coated adhesive film is controlled by adjusting the UV lamp intensity and/or the web speed. Nonlimiting examples of time periods for processing adhesives of the present subject matter are typically less than 60 minutes, more typically less than 10 minutes, in many embodiments less than 1 minute, and in particular embodiments less than 10 seconds.

Upon exposing adhesive to the noted conditions, if the adhesive includes CAPs, the adhesive then includes an ETLN. As previously described, the ETLN adhesives of the present subject matter exhibit an array of advantages and benefits and particularly when compared to non-architecture polymers which produce randomly crosslinked networks.

As will be understood, during conversion of the composition(s) of the present subject matter from a pre-adhesive to a pressure sensitive adhesive, in many embodiments, the modulus of the composition changes while the glass transition temperature (Tg) does not change or remains substantially the same.

Articles

The present subject matter provides a wide array of articles that include the noted compositions, pre-adhesives, and/or adhesives. Examples of such articles include adhesive tapes including double sided and single sided tapes; label stock; label constructions; packaging products and assemblies including food packages, packaging for household goods and industrial goods and particularly reclosable packages; and other items.

Figure 6:
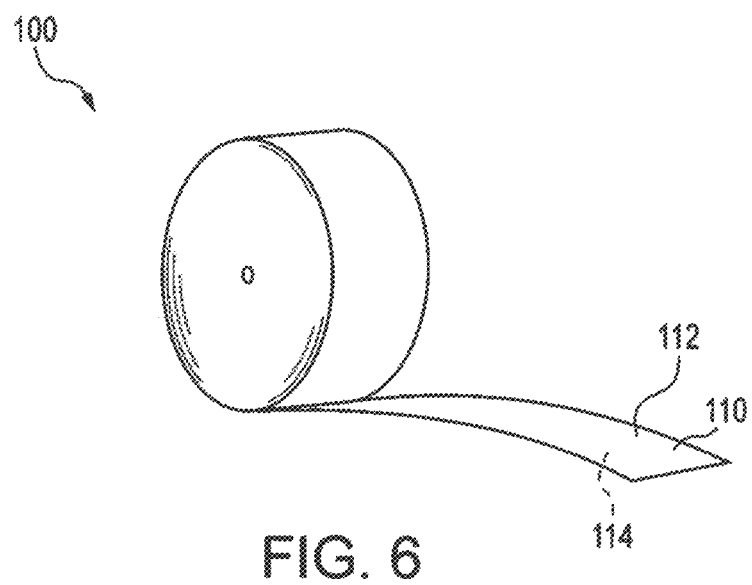
FIG. 6 is a schematic illustration of a tape article including an adhesive in accordance with the present subject matter.

FIG. 6 illustrates a tape article 100 in accordance with an embodiment of the present subject matter. The tape article 100 is shown in a roll form, however, it will be appreciated that the tape could be in a flat, sheet, or Z-fold form. The tape article 100 generally includes a substrate 110 defining a first face 112 and an oppositely directed second face 114. The tape 100 includes a layer or region of an adhesive as described herein disposed on one or both faces 112, 114. One or more release liners and/or low surface energy coatings can be used as described in greater detail herein.

Figure 7:
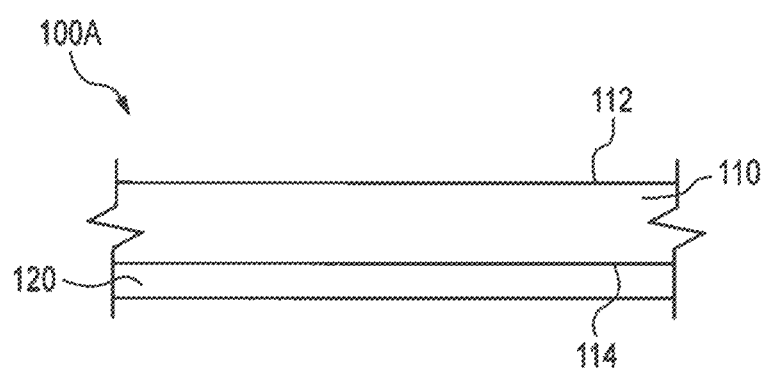
FIG. 7 is a schematic cross sectional view of another tape article in accordance with the present subject matter.

FIG. 7 is a schematic cross sectional view of a tape 100A comprising a substrate 110 defining a first face 112 and an oppositely directed second face 114. The tape 100A also comprises a layer or region of an adhesive 120 disposed on one of the faces such as for example face 114. One or more low surface energy coatings can be disposed on the face 112 of the substrate 110.

Figure 8:
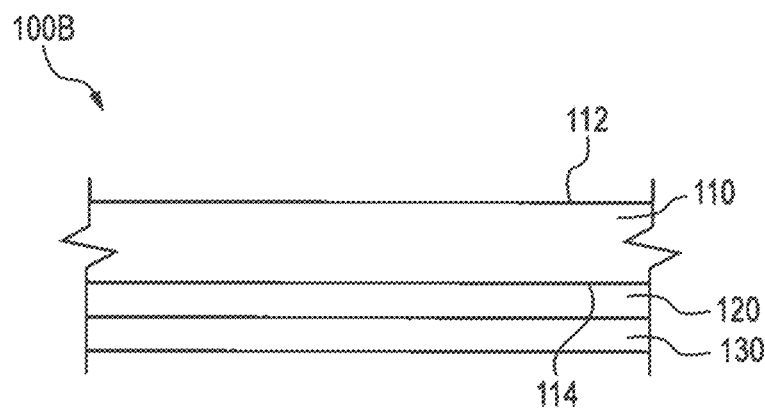
FIG. 8 is a schematic cross sectional view of another tape article in accordance with the present subject matter.

FIG. 8 is a schematic cross sectional view of a tape 100B comprising a substrate 110 defining a first face 112 and an oppositely directed second face 114. The tape 100B also comprises a layer or region of an adhesive 120 disposed on one of the faces such as for example face 114. The tape 100B also comprises a release liner 130 covering the adhesive 120. One or more low surface energy coatings can be disposed on the face 112 of the substrate 110.

Figure 9:
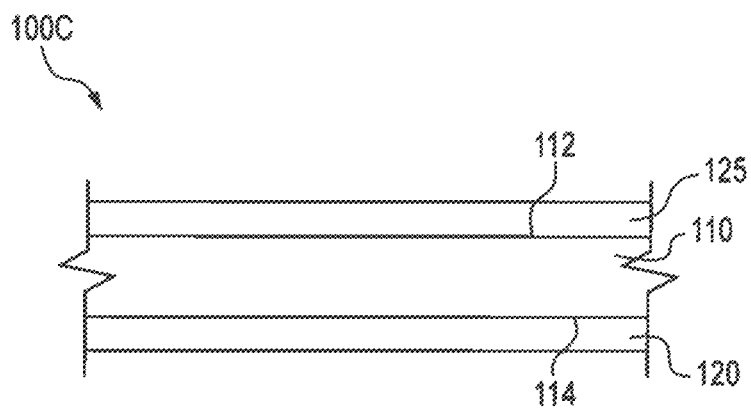
FIG. 9 is a schematic cross sectional view of another tape article in accordance with the present subject matter.

FIG. 9 is a schematic cross sectional view of a tape 100C comprising a substrate 110 defining a first face 112 and an oppositely directed second face 114. The tape 100C also comprises a first layer or region of an adhesive 120 disposed on one of the faces such as for example face 114. The tape 100B also comprises a second layer or region of an adhesive 125 disposed on the face 112 of the substrate 110.

Figure 10:
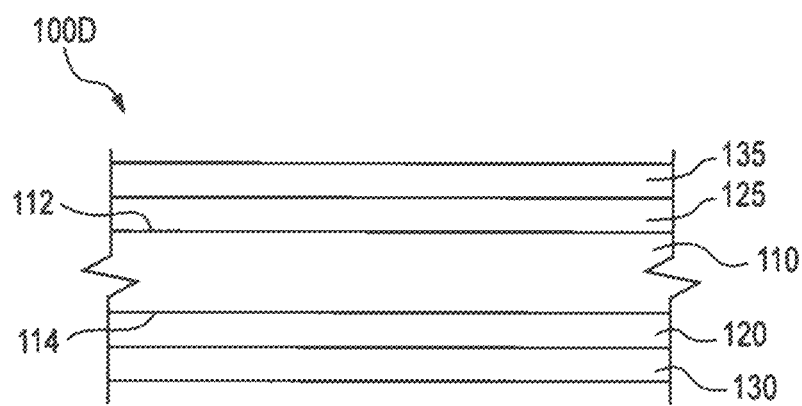
FIG. 10 is a schematic cross sectional view of another tape article in accordance with the present subject matter.

FIG. 10 is a schematic cross sectional view of a tape 100D comprising a substrate 110 defining a first face 112 and an oppositely directed second face 114. The tape 100D also comprises a first layer or region of an adhesive 120 disposed on one of the faces such as for example face 114. The tape 100D also comprises a second layer or region of an adhesive 125 on the face 112. The tape 100D also comprises a first release liner 130 covering the adhesive 120. And, the tape 100D additionally comprises a second release liner 135 covering the adhesive 125.

Figure 11:
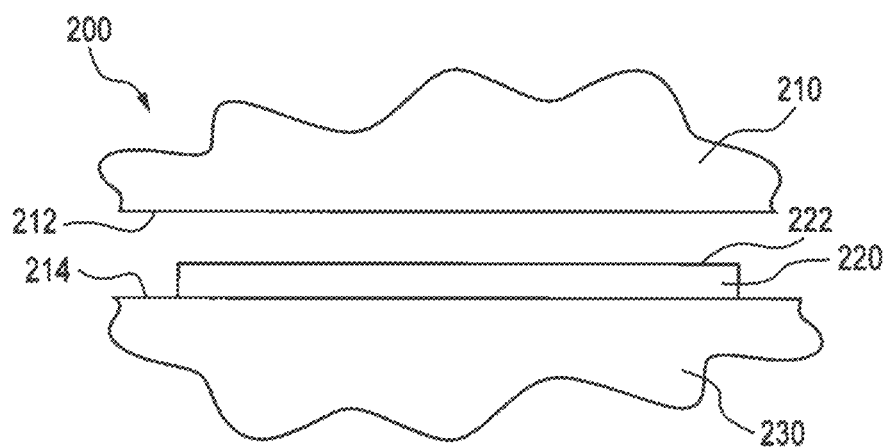
FIG. 11 is a schematic cross sectional view of a sealing or closure assembly including a region of an adhesive in accordance with the present subject matter.
Figure 12:
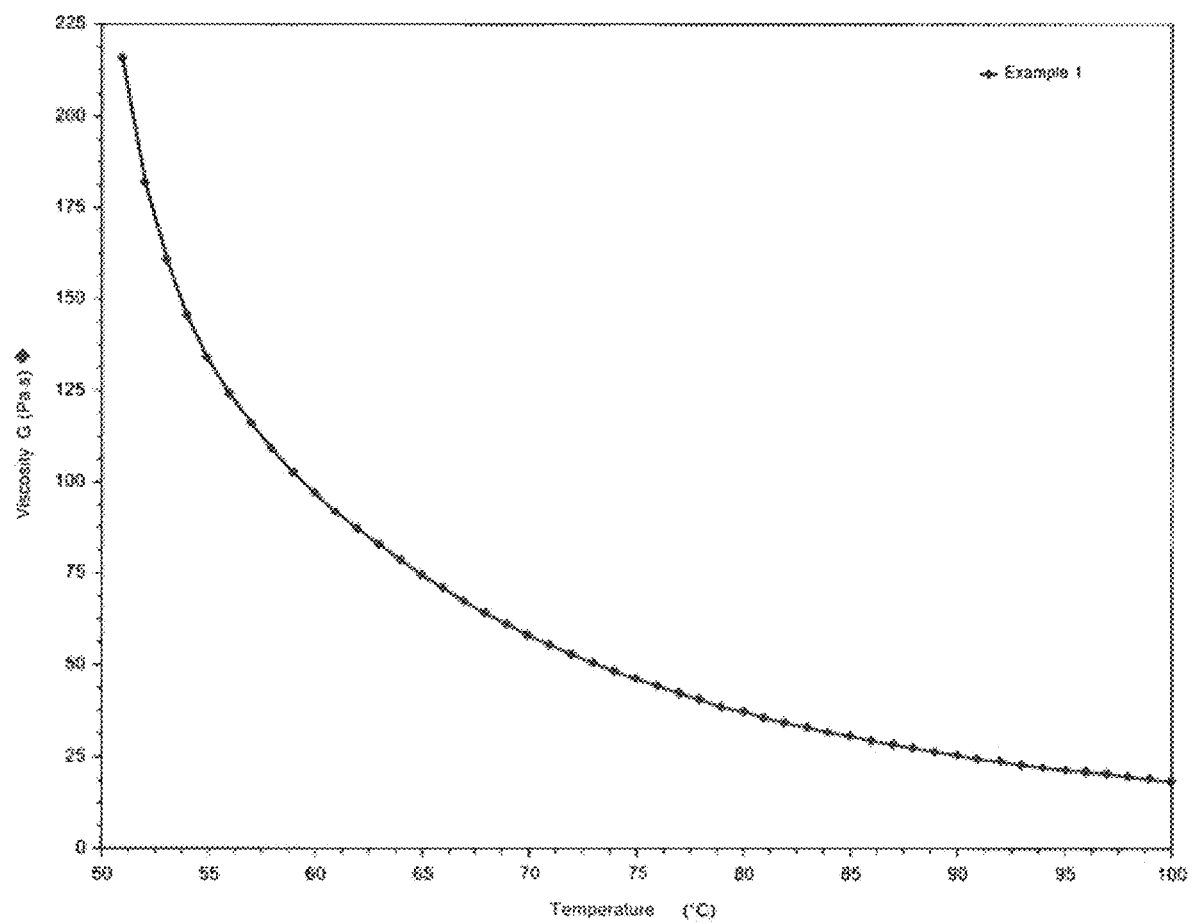
FIG. 12 is a plot of Melt Viscosity versus Temperature for Example 1
Figure 13:
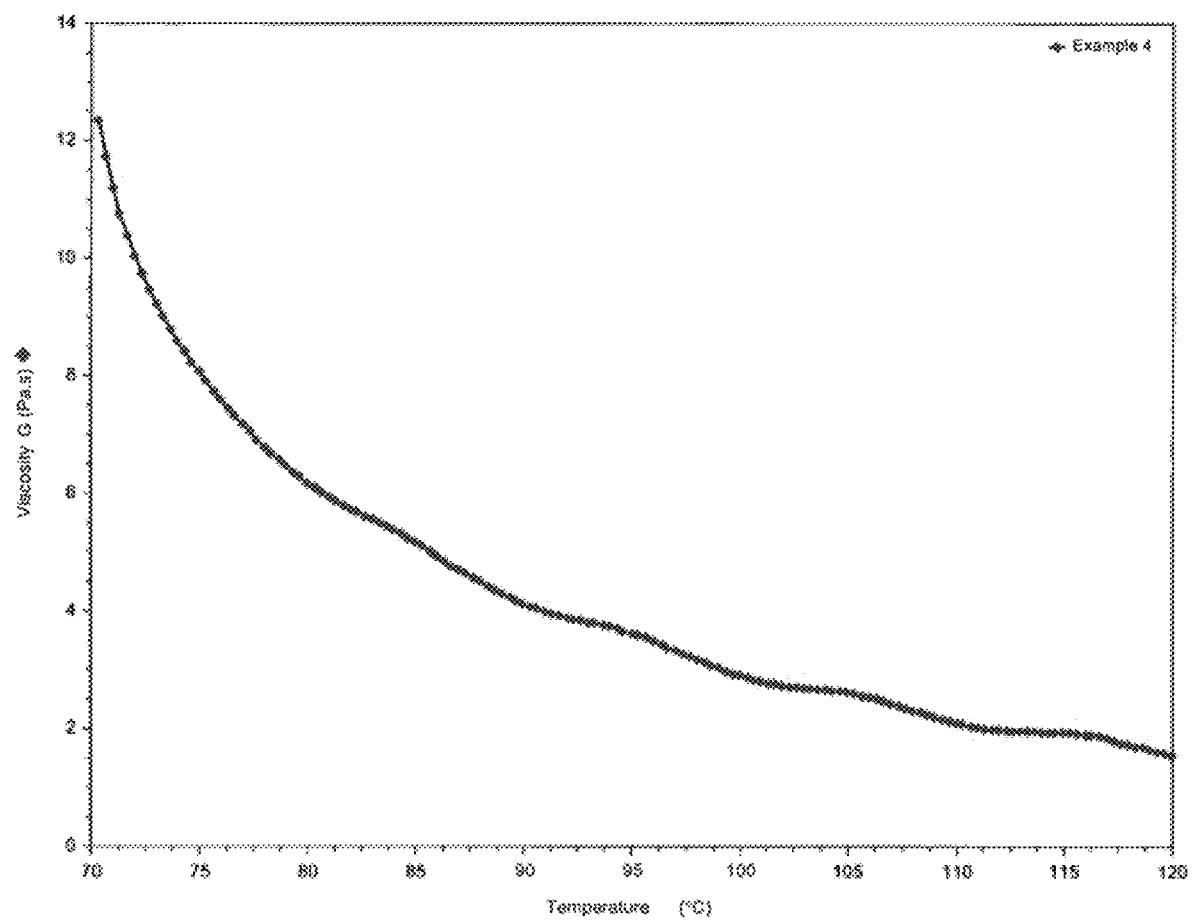
FIG. 13 is a plot of Melt Viscosity versus Temperature for Example 4
Figure 14:
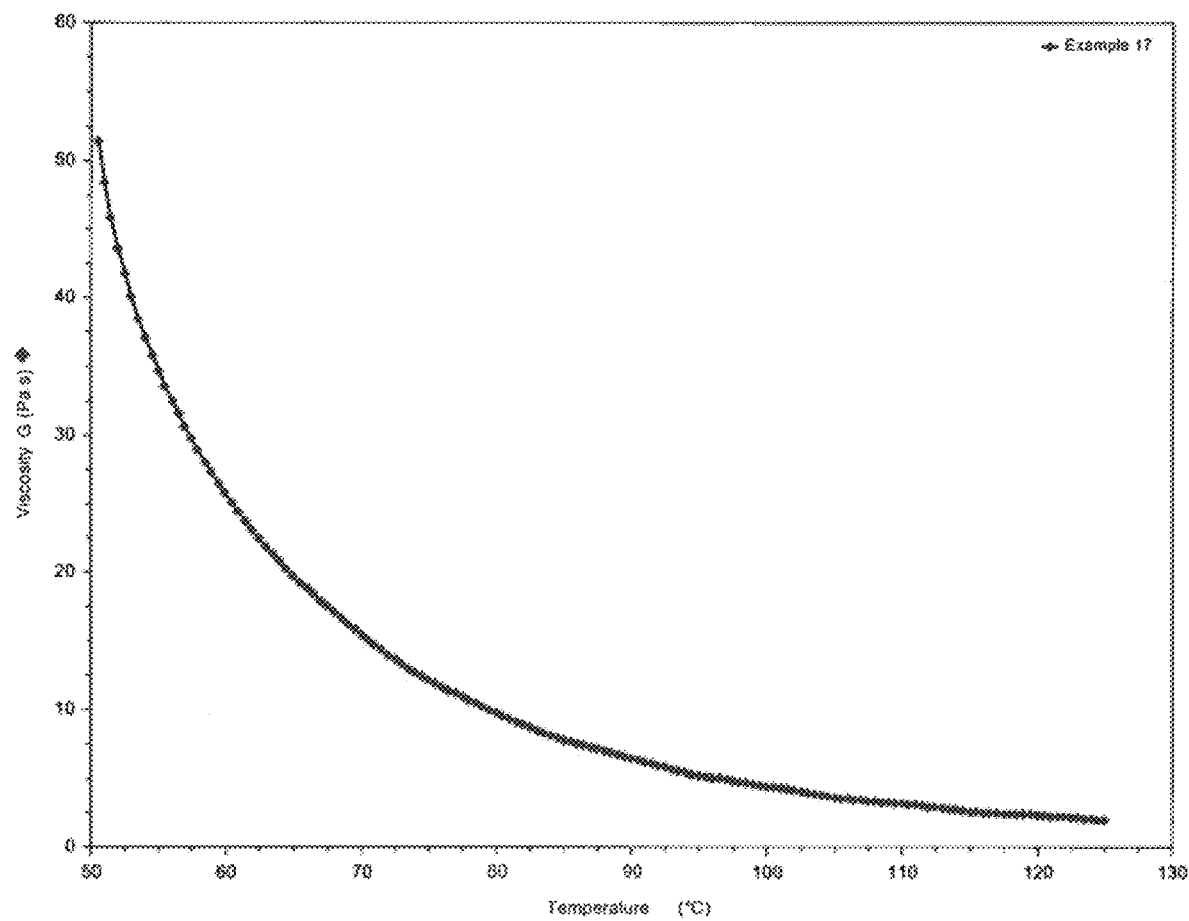
FIG. 14 is a plot of Melt Viscosity versus Temperature for Example 17
Figure 15:
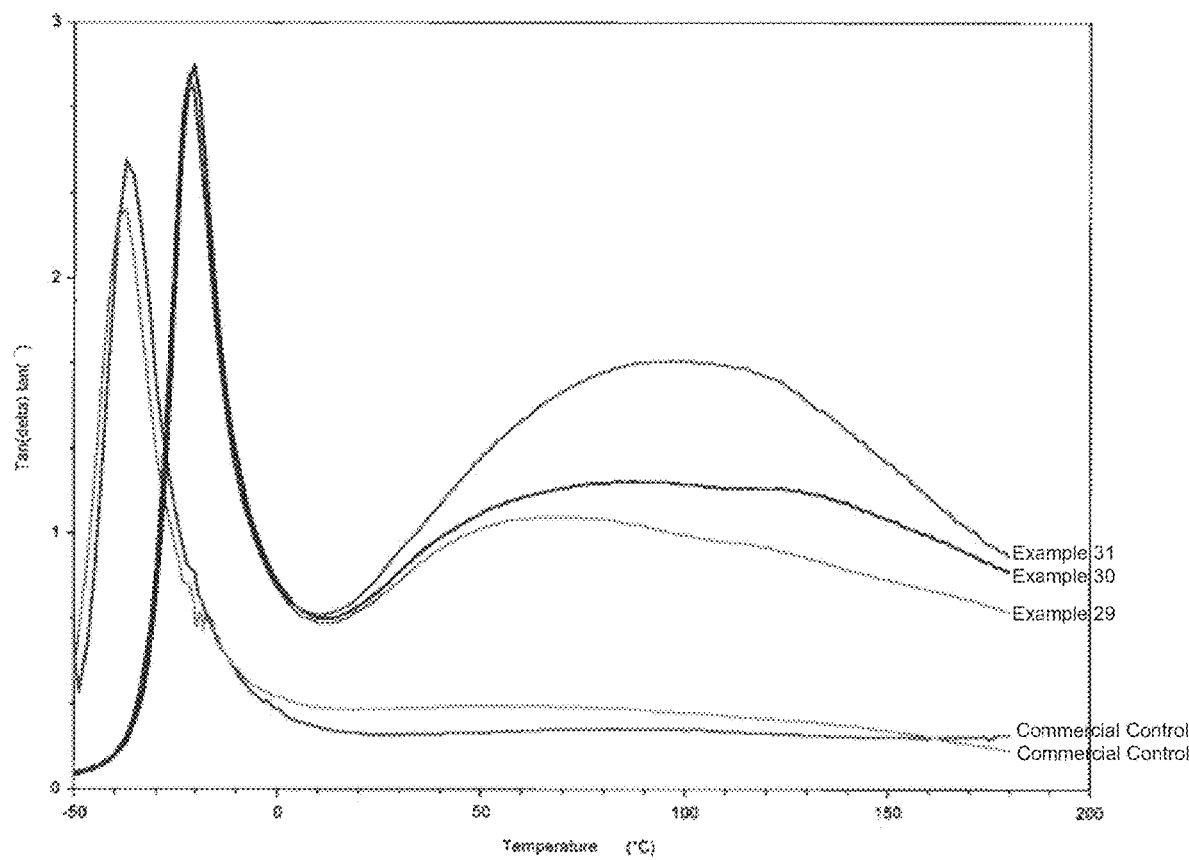
FIG. 15 is a plot of Tan(delta) vs temperature for samples 29-31 and commercial controls
Figure 16:
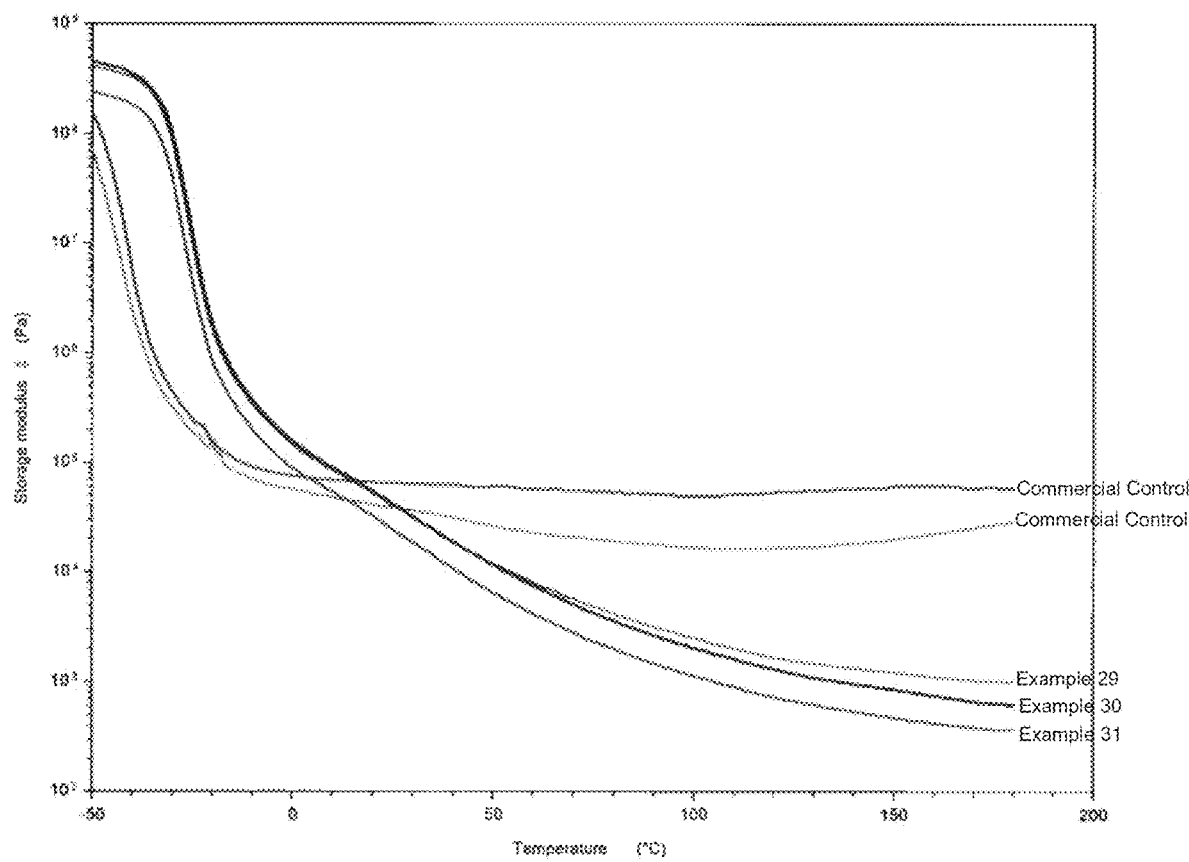
FIG. 16 is a plot of Elastic/Storage Modulus vs temperature for samples 29-31 and commercial controls

FIG. 11 is a schematic cross sectional view of a sealing, closure, or reclosure assembly 200 in accordance with the present subject matter. This assembly comprises a first substrate 210 defining a first substrate face 212, a second substrate 230 defining a second substrate face 214, and one or more layers or regions of an adhesive 220 defining an adhesive face 222. The adhesive 220 is disposed on one or both substrate faces 212, 214. The adhesive 220 serves to seal and/or adhere the substrates 210, 230 together upon contact between the adhesive face 222 and the substrate face 212. As will be understood, the adhesive 220 is any of the adhesives described herein. The assembly 200 can be utilized in association with and/or incorporated in a wide array of packaging products including for example food packages, packages for household goods, industrial goods packages, and in particular reclosable packages.

The adhesive layer may have a thickness as desired for a particular purpose or intended use. In one embodiment, the adhesive layer may have a thickness from about 10 to about 125, or from about 10 to about 75, or from about 10 to about 50 microns. In one embodiment, the coat weight of the adhesive may be in the range of about 10 to about 50 grams per square meter (gsm), and in one embodiment about 20 to about 35 gsm.

Release liners for use in the present subject matter may be those known in the art or those later discovered. In general, suitable release liners include, but are not limited to, polyethylene coated papers with a commercial silicone release coating, polyethylene coated polyethylene terephthalate films with a commercial silicone release coating, or cast polypropylene films that can be embossed with a pattern or patterns while making such films, and thereafter coated with a commercial silicone release coating. An exemplary release liner is kraft paper which has a coating of low density polyethylene on the front side with a silicone release coating and a coating of high density polyethylene or polypropylene on the back side. Other release liners known in the art are also suitable as long as they are selected for their release characteristics relative to the pressure sensitive adhesive chosen for use in the adhesive article, that is, the adhesive will have a greater affinity for the face stock than the liner.

As previously noted, one or more low surface energy coatings can be used in the articles utilizing the adhesives described herein. For example, for rolled tape products it may be desirable to provide a coating of a low surface energy agent along a rear face of a substrate or tape component that contacts the adhesive. Nonlimiting examples of low surface energy coatings include silicone agents, polypropylene or other polyolefins, certain fluorocarbons, and certain fatty acid esters.

A benefit of particular adhesives of the present subject matter involves maintenance of performance criteria upon continued exposure to UV radiation. For example, a disadvantage of many conventional UV cured, randomly crosslinked adhesive networks is that additional UV exposure results in additional crosslinking. This may in turn result in undesirable changes in the adhesive and/or its performance. Specifically, this may be undesirable for clear or transparent labels that are UV printed downstream. In contrast, many embodiments of the present subject matter adhesives do not exhibit performance changes upon additional UV exposure.

EXAMPLES

The following test methods were used to evaluate the properties of the various compositions, precursors, pre-adhesives and adhesives of the present subject matter.

All adhesion data was tested off Polypropylene (PP) facestocks without corona treatment. Samples were isolated from solvent through solvent casting at controlled thicknesses of 8-20 grams per square meter onto paper with 100% solids Pt cured silicone release layer and being placed in forced air ovens at temps of 60-120° C. Adhesives were then transfer coated to the PP. All samples are dwelled in a climate controlled room for 24 hours before testing.

The average molecular ($M_w$) weight and polydispersity (PDI) were determined by gel permeation chromatography (GPC). The samples were evaluated on a Waters Acquity Advance Polymer Chromatography system. The eluent used was TetraHydroFuran (THF) containing stabilizer. Measurement was carried out at 35° C. Separation was carried out using the columns HSP Gel RT MB-M (1,000 to 4,000,000 Dalton range), HSP Gel HT MB-L/M (500-4,000,000 Dalton range), and HSP Gel HR 1.0 (100-1,000 Dalton range). The sample concentration was 2 g/l, the flow rate of 0.7 ml/min. Measurement was carried out against polystyrene standards.

The adhesive samples were cast from solvents and lightly dried to a solvent free coating. The coating is then cured and heat welded into 5 μm LS Mitex Membrane Filters. The filters are then soaked in THF for 1 week. The weights before and after soaking are compared. Percent gel/insoluble=wt after soak÷ wt after soak*100.

Melt Flow was measured on a TA Instruments AR2000 rheometer fitted with a cone and plate clamp. The experiments were performed with a temp sweep from 100° C. to 130° C. The temp ramp rate was set at 1° C./min and a shear rate of 0.25 sec$^{-1}$.

DMA was performed on a TA Instruments AR2000 rheometer fitted with parallel plate clamps. 1.0 mm thick samples were placed in the clamp and annealed at 70° C. for 10 minutes to ensure good adhesion. The samples were then cooled to −60° C. to begin a temp sweep to 150° C. at a ramp rate of 3° C./min. During the temp ramp, the samples were oscillated at a frequency of 10 rad/sec. 90 degree peels according to PSTC 101 Method F. Chemicals used and their suppliers are listed below.

TABLE 1

| Trade name | Function | Supplier |
|---|---|---|
| Hycat 2000S | Catalyst | Dimension Technology Chemical Systems Inc |
| 4HTEMPO | inhibitor | Sigma Aldrich |
| Irgacure 2959 | photoinitiator | BASF |
| Irgacure 4265 | photoinitiator | BASF |
| Dertophene T115 | tackifier | DRT |
| DPHA | multi functional acrylate | Sigma Aldrich |
| MSA | acid catalyst | Sigma Aldrich |
| DBTDL | Catalyst | Sigma Aldrich |
| D200 | isocyanate-acrylate | Allnex |
| PETTA | multi functional acrylate | Sigma Aldrich |
| D-200XP | isocyanate-acrylate | Allnex |

TABLE 1-continued

| Trade name | Function | Supplier |
|---|---|---|
| Esacure one | photoinitiator | IGM Resins |
| ADMA 14 | Compatablizer | Albemarle |
| BlocBuilder MA | Polymerization Controller | Arkema |
| Sodium AcetylAcetonate | Neutralizer | Sigma Aldrich |
| BA | monomer | commercial source |
| EHA | monomer | commercial source |
| AA | monomer | commercial source |
| GMA | monomer | commercial source |
| MA | monomer | commercial source |
| maleic Anhydride | monomer | commercial source |
| 4-HBA | monomer | commercial source |
| Propyl Acetate | solvent | commercial source |
| MEK | solvent | commercial source |
| Ethyl Acetate | solvent | commercial source |
| Toluene | solvent | commercial source |

Example 1 (Precursor): Preparation of Segmented Acrylic Polymer Having Epoxy Functionality Using SFRP Agent as a Precursor to Acrylation (KH6-2)

An acrylic copolymer with reactive functionalities positioned in one segment adjacent to the polymer chain end is prepared as follows. Into a 1500 ml reactor equipped with a heating jacket, agitator, reflux condenser, feed tanks and nitrogen gas inlet there is charged 7.25 g of BlocBuilderMA (SFRP Agent). The reactor is then inerted with nitrogen for 1 hour at 0.5 litre/min. Monomers and solvents are added in the following amounts to a feed vessel and inerted with nitrogen for 1 hour at 0.5 litre/min. After inertion, the monomer and solvent mix was added to the reactor to generate the segment adjacent to the polymer chain ends.

71.32 g Butyl Acrylate
71.32 g 2-EthylHexyl Acrylate
141.85 g Propyl Acetate

The reactor charge is heated to 70° C. (reactor Jacket to 81° C.) to initiate the BlocbuilderMA reaction with the initial acrylate monomers. At 70° C., T=0 and hold below 85° C. for 30 minutes to complete the initial reaction. At this point, the Blocbuilder MA has added acrylate groups and is inert until heated above 100° C. At the end of the 30 minute hold, the reaction is heated to reflux conditions (reactor jacket 130° C.) with a constant nitrogen purge. At 100° C., 18.90 g Glycidyl MethAcrylate is added to the reactor and a 90 minute hold is started in which the reaction will reach a reflux during this hold at approximately 112° C. This is to create the epoxy functional segment with a theoretical Mn of 8,489 g/mol. During the 90 minute hold, a reagent feed mixture with an active nitrogen purge of 336.79 g propyl acetate, 641.88 g 2-ethylhexyl acrylate, and 641.88 g butyl acrylate is weighed into a feed vessel and inerted with nitrogen at 0.5 litre/minute. After the initial 90 minute hold, the reagent feed is added over a period of sixty minutes to the reactor at a rate of 2 grams/minute. After the sixty minute feed, the rate is ramped to 4.00 grams/min for 30 minutes. After the 30 minute reed rate 2, the feed rate is increased to 8.00 grams/minute until the reagent feed is depleted. During the reagent feeds the temperature of the reaction is held at 115-122° C. The reaction conditions are maintained after completion of the reagent feed until a conversion of at least about 90% of butyl acrylate and 2-ethyl hexyl acrylate is achieved. Conversion for this example was greater than 92.0%. This is to create the remainder of the non-epoxy functional segment adjacent to the epoxy functional segment at the end of the polymer. The total theoretical Mn of the non-epoxy functional segment is 67,463 g/mol. At this time, the polymer is cooled to about 85° C. Once the polymer is about 85° C., 1.45 g of tertiary amyl peroxy pivalate and 67.36 g propyl acetate are mixed in a 100 mL feed vessel and inerted for 15 minutes with nitrogen at 0.5 litre/minute. After inertion, the pivalate solution is added to the reactor over ninety minutes. At the completion of the pivalate feed, the reaction temperature is held between 85° C. and 90° C. for 1 hour. The resulting solution polymer is then cooled to ambient temperature. During the cool down, 4.39 g of Sodium AcetylAcetonate and 24.86 g of Propyl Acetate were added to the reactor to neutralize the acid from BlocbuilderMA. Once at ambient temperature the polymer is discharged from the reactor. The theoretical molecular weight was 75,953 g/mol Mn with 7 epoxy groups on one chain end.

The resulting solution polymer was isolated from solvent to form a liquid polymer using rotary evaporation and evaluated for melt viscosity using a cone and plate fitted on a dynamic mechanical analysis rheometer.

Example 2 (Pre-Adhesive): Preparation of Segmented Acrylic Polymer Having ENE (Double Bond) Functionality Using Example 1 as a Precursor to Target at Least Above 80% Acrylation with Acrylic Acid (EB15-17)

An acrylic copolymer with reactive ENE functionalities positioned in one segment adjacent to the polymer chain end is prepared as follows. Into a 1500 ml reactor equipped with a heating jacket, agitator, reflux condenser, feed tanks and nitrogen gas inlet there is charged 469.31 g of Example 1 (epoxy precursor). The reactor charge is heated to 70° C. (reactor Jacket to 79° C.). Once at 70° C., 3.41 g of Hycat 2000s (chrome catalyst) and 64.71 g of Propyl acetate are added to the reactor. The mixture is allowed to mix under 150 rpm agitation for 10 minutes. After mixing the catalyst in, 1.80 g of Acrylic Acid is added to the reactor along with 5.00 g of propyl acetate as a rinse for any residual Acrylic Acid. The mix was held under agitation for approximately 40 minutes. After mixing, 1.70 g of 4-Hydroxy TEMPO and 32.30 g of propyl acetate are added to the reactor to prevent polymerizations of the double bonds of the acrylated pre-adhesive composition. The mixture was held between 70-72° C. for 24 hours. Acrylic Acid conversion was monitored with gas chromatography over that hold time. After 24 hours, the polymer was cooled to ambient temperature and discharged. The resulting polymer has 3 epoxy groups that were converted to ENE functionality to result in a pre-adhesive that is curable upon actinic/UV radiation.

Example 3: Preparation of Segmented Acrylic Polymer Having ENE Functionality after Acrylation of Example 1 and Formulated for UV Curing the Pre-Adhesive (AK4-11)

Example 1 was formulated with 1% on solids Irgacure 2959 which was purchased from BASF and 250 ppm 4-Hydroxy TEMPO. In addition, Example 1 was formulated with 1% on solids Hycat 2000s and enough molar equivalents Acrylic Acid to acrylate at least about 80% of the epoxy groups on Example 1. All the components were mixed together in an 8 oz. amber jar using a tumbler. After mixing, the jar was placed in a 70° C. oven for 24 hours to complete the acrylation step.

TABLE 2

Example 3 addition amounts in grams

| Example 1 | Acrylic Acid | 4HTEMPO | Hycat | Irg 2959 |
|---|---|---|---|---|
| 129.2 | 0.494 | 0.46 | 18.76 | 9.52 |

Example 1 = 72.61% in Propyl Acetate
Acrylic Acid = 100%
4HTEMPO = 5% in propyl acetate
Hycat = 5% in propyl acetate
Irag 2959 = 10% in Methyl Ethyl Ketone

TABLE 3

Results

| lot | filter Wt | polymer Wt | post soak filter + polymer | % gel | Average | St dev |
|---|---|---|---|---|---|---|
| 1 | 0.255 | 0.06 | 0.291 | 60% | 62% | 2% |
| 2 | 0.25 | 0.088 | 0.306 | 64% | | |
| 3 | 0.249 | 0.082 | 0.301 | 63% | | |

Example 4: Preparation of Segmented Acrylic Polymer Having Acid Functionality Using SFRP Agent as a Precursor to Acrylation (KH6-4)

An acrylic copolymer with reactive functionalities positioned in one segment adjacent to the polymer chain end is prepared as follows. Into a 1500 ml reactor equipped with a heating jacket, agitator, reflux condenser, feed tanks and nitrogen gas inlet there is charged 9.10 g of BlocBuilder MA (SFRP Agent). The reactor is then inerted with nitrogen for 1 hour at 0.5 litre/min. Monomers and solvents are added in the following amounts to a feed vessel and inerted with nitrogen for 1 hour at 0.5 litre/min. After inertion, the monomer and solvent mix was added to the reactor to generate the segment adjacent to the polymer chain ends.

89.57 g Butyl Acrylate
89.57 g 2-EthylHexyl Acrylate
12.04 g Acrylic Acid
178.14 g Propyl Acetate The reactor charge is heated to 70° C. (reactor Jacket to 81° C.) to initiate the BlocbuilderMA reaction with the initial acrylate Monomers. At 70° C., T=0 and hold below 85° C. for 30 minutes to complete the initial reaction. At this point, the BlocbuilderMA has added acrylate groups and is inert until heated above 100° C. At the end of the 30 minute hold, the reaction is heated to reflux conditions (reactor jacket 130° C.) with a constant nitrogen purge. At 100° C., a 90 minute hold is started in which the reaction will reach a reflux during this hold at approximately 112° C. This is to create the acid functional segment with a theoretical Mn of 8,004 g/mol. During the 90 minute hold, a reagent feed mixture with an active nitrogen purge of 422.96 g propyl acetate, 806.11 g 2-ethylhexyl acrylate, and 806.11 g butyl acrylate is weighed into a feed vessel and inerted with nitrogen at 0.5 litre/minute. After the initial 90 minute hold, the reagent feed is added over a period of sixty minutes to the reactor at a rate of 2 grams/minute. After the sixty minute feed, the rate is ramped to 4.00 grams/min for 30 minutes. After the 30 minute reed rate 2, the feed rate is increased to 8.00 grams/minute until the reagent feed is depleted. During the reagent feeds the temperature of the reaction is held at 115-122° C. The reaction conditions are maintained after completion of the reagent feed until a conversion of at least about 90% of butyl acrylate and 2-ethylhexyl acrylate is achieved. This is to create the remainder of the non-acid functional segment adjacent to the epoxy functional segment at the end of the polymer. The total theoretical Mn of the non-acid functional segment is 67,500 g/mol. At this time, the polymer is cooled to 85° C. Once the polymer is 85° C., 1.80 g of tertiary amyl peroxy pivalate and 84.59 g propyl acetate are mixed in a 100 mL feed vessel and inerted for 15 minutes with nitrogen at 0.5 litre/minute. After inertion, the pivalate solution is added to the reactor over ninety minutes. At the completion of the pivalate feed, the reaction temperature is held between 85° C. and 90° C. for 1 hour. The resulting solution polymer is then cooled to ambient temperature and discharged from the reactor. The theoretical molecular weight was 75,505 g/mol Mn with 7 acid groups on one chain end. The measured Mn was 48197 g/mol with a PDI of 2.45.

The resulting solution polymer was isolated from solvent using rotary evaporation and evaluated for melt viscosity using a cone and plate fitted on a dynamic mechanical analysis rheometer.

Example 5: Preparation of Segmented Acrylic Polymer Having ENE Functionality Using Example 4 as a Precursor to Target at Least about 80% Acrylation with Glycidyl MethAcrylate (KH6-8)

An acrylic copolymer with reactive ENE functionalities positioned in one segment adjacent to the polymer chain end is prepared as follows. Into a 1500 ml reactor equipped with a heating jacket, agitator, reflux condenser, feed tanks and nitrogen gas inlet there is charged 257.32 g of Example 4 (acid precursor). Under agitation of 50 rpm, 0.04 g 4-Hydroxy TEMPO and 3.96 g of Methyl Ethyl Ketone is added to the reactor and allowed to mix for 5 minutes. Next, 2.11 g of Gylcidyl MethAcrylate is added to the reactor and allowed to mix for 5 minutes. Finally, 1.00 g of Hycat 200S and 18.94 g of propyl acetate are added to the reactor and allowed to mix. Once the Hycat is added to the reactor, the reactor charge is heated to 70° C. (reactor Jacket to 83° C.). Once at 70° C., T=0 and agitation is increased to 100 rpm. The mixture was held between 72-74° C. for 7 hours. Glycidyl MethAcrylate conversion was monitored with gas chromatography over that hold time. After 7 hours, the polymer was cooled to ambient temperature and discharged. The resulting polymer has 4.5 acid groups that were converted to ENE functionality to result in a pre-adhesive that is curable upon actinic/UV radiation.

Example 6: Preparation of Segmented Acrylic Polymer Having ENE Functionality Using Example 4 as a Precursor to Target at Least about 80% Acrylation with Glycidyl MethAcrylate (KH6-9)

An acrylic copolymer with reactive ENE functionalities positioned in one segment adjacent to the polymer chain end is prepared as follows. Into a 1500 ml reactor equipped with a heating jacket, agitator, reflux condenser, feed tanks and nitrogen gas inlet there is charged 289.65 g of Example 4 (acid precursor). Under agitation of 75 rpm, 0.04 g 4-Hydroxy TEMPO and 3.96 g of Methyl Ethyl Ketone is added to the reactor and allowed to mix for 5 minutes. Next, 2.37 g of Gylcidyl MethAcrylate is added to the reactor and allowed to mix for 5 minutes. Finally, 1.12 g of Hycat 200S and 21.34 g of propyl acetate are added to the reactor and allowed to mix. Once the Hycat is added to the reactor, the reactor charge is heated to 80° C. (reactor Jacket to 84° C.). Once at 80° C., T=0 and agitation is increased to 100 rpm. The mixture was held between 79-81° C. for 7 hours. Glycidyl MethAcrylate conversion was monitored with gas chromatography over that hold time. After 7 hours, the polymer was cooled to ambient temperature and discharged. The resulting polymer has 5 acid groups that were converted to ENE functionality to result in a pre-adhesive that is curable upon actinic/UV radiation.

Example 7: Preparation of Segmented Acrylic Polymer Having ENE Functionality Using Example 4 as a Precursor to Target 80% Acrylation with Glycidyl MethAcrylate (KH6-11)

An acrylic copolymer with reactive ENE functionalities positioned in one segment adjacent to the polymer chain end is prepared as follows. Into a 1500 ml reactor equipped with a heating jacket, agitator, reflux condenser, feed tanks and nitrogen gas inlet there is charged 331.43 g of Example 4 (acid precursor). Under agitation of 75 rpm, 0.24 g of Hycat 200S and 4.53 g of propyl acetate is added to the reactor and allowed to mix for 5 minutes. Next, 0.05 g 4-Hydroxy TEMPO and 0.91 g of propyl acetate is added to the reactor and allowed to mix for 5 minutes. Finally, 2.50 g of Gylcidyl MethAcrylate are added to the reactor and allowed to mix. Once the GMA is added to the reactor, the reactor charge is heated to 80° C. (reactor Jacket to 84° C.). Once at 80° C., T=0 and agitation is increased to 100 rpm. The mixture was held between 79-81° C. for 2 hours. Glycidyl MethAcrylate conversion was monitored with gas chromatography over that hold time. After 2 hours, the polymer was cooled to ambient temperature and discharged. The resulting polymer has 0.5 acid groups that were converted to ENE functionality to result in a pre-adhesive that is curable upon actinic/UV radiation.

TABLE 4

Examples 5-7 Formulations and Reaction Conditions

| Example | Precursor | % bos Chrome | ppm TEMPO | Acrylation Temp |
|---------|-----------|--------------|-----------|-----------------|
| 5 | example 4 | 0.50% | 200 | 70 |
| 6 | example 4 | 0.50% | 200 | 80 |
| 7 | example 4 | 0.10% | 200 | 80 |

Examples 8-12: Preparation of Segmented Acrylic Polymer Having ENE Functionality after Various Levels of Acrylation of Example 4 and Formulated for UV Curing the Pre-Adhesive Example 4 was formulated with 1% on solids Irgacure 2959 which was purchased from BASF and 200 ppm 4-Hydroxy TEMPO purchased from Sigma Aldrich. In addition, Example 4 was formulated with 0.5% on solids Hycat 2000s and enough molar equivalents Glycidyl MethAcrylate (GMA) to acrylate 50%-100% of the Acid groups on Example 4. All the components were mixed together in an 8 oz. amber jar using a tumbler. After mixing, the jar was placed in a 70° C. oven for 24 hours to complete the acrylation step.

TABLE 5

Example 8-9 addition amounts in grams

| Example # | Example 4 | % Acrylation Target | GMA (g) | Hycat (g) | 4HTEMPO (g) | Irg 2959 (g) |
|---|---|---|---|---|---|---|
| 8 | 28.15 | 50% | 0.144 | 2.18 | 0.087 | 2.2 |
| 9 | 15.96 | 60% | 0.098 | 1.23 | 0.049 | 1.25 |
| 10 | 14.65 | 80% | 0.12 | 1.13 | 0.045 | 1.15 |
| 11 | 18.74 | 90% | 0.172 | 1.45 | 0.058 | 1.47 |
| 12 | 21.42 | 100% | 0.219 | 1.66 | 0.066 | 1.69 |

Example 3 = 77.54% in propyl acetate
GMA = 100%
Hycat = 5% in propyl acetate
4HTEMPO = 5% in propyl acetate
Irg 2959 = 10% in Methyl Ethyl Ketone

TABLE 6

Results

| Example | Lot | Filter | Polymer | Post Soak Filter + polymer | % gel | Average | St dev |
|---|---|---|---|---|---|---|---|
| 8 | 1 | 0.243 | 0.073 | 0.262 | 26% | 22% | 7% |
|  | 2 | 0.248 | 0.063 | 0.257 | 14% |  |  |
|  | 3 | 0.255 | 0.066 | 0.272 | 26% |  |  |
| 9 | 1 | 0.249 | 0.068 | 0.267 | 26% | 30% | 3% |
|  | 2 | 0.245 | 0.075 | 0.269 | 32% |  |  |
|  | 3 | 0.256 | 0.076 | 0.279 | 30% |  |  |
| 10 | 1 | 0.258 | 0.07 | 0.283 | 36% | 37% | 2% |
|  | 2 | 0.25 | 0.071 | 0.276 | 37% |  |  |
|  | 3 | 0.252 | 0.063 | 0.277 | 40% |  |  |
| 11 | 1 | 0.246 | 0.072 | 0.273 | 38% | 40% | 3% |
|  | 2 | 0.253 | 0.08 | 0.288 | 44% |  |  |
|  | 3 | 0.255 | 0.077 | 0.285 | 39% |  |  |
| 12 | 1 | 0.26 | 0.074 | 0.292 | 43% | 45% | 2% |
|  | 2 | 0.253 | 0.085 | 0.291 | 45% |  |  |
|  | 3 | 0.264 | 0.077 | 0.301 | 48% |  |  |

Examples 13-16: Preparation of Segmented Acrylic Polymer Having ENE Functionality after Various Levels of Acrylation of Example 4 and Formulated for UV Curing the Pre-Adhesive Example 4 was formulated with 1% on solids Irgacure 2959 which was purchased from BASF and 200 ppm 4-Hydroxy TEMPO purchased from Sigma Aldrich. Performance aids Dertophene T115 (T115) purchased from DTR and DiPentaerythritol HexylAcrylate (DPHA) purchased from Sigma Aldrich were formulated into Example 4 at various levels. In addition, Example 4 was formulated with 0.5% on solids Hycat 2000s and enough molar equivalents Glycidyl MethAcrylate (GMA) to acrylate 80% of the Acid groups on Example 4. All the components were mixed together in an 8 oz. amber jar using a tumbler. After mixing, the jar was placed in a 70° C. oven for 24 hours to complete the acrylation step.

TABLE 7

Example 10, 13-16 addition amounts in grams

| Example # | Example 4 | % Acrylation Target | GMA (g) | Hycat (g) | 4HTEMPO (g) | Irg 2959 (g) | T115 (g) | DPHA (g) |
|---|---|---|---|---|---|---|---|---|
| 13 | 30 | 80% | 0.245 | 2.33 | 0.093 | 2.36 | 11.88 | 0.148 |
| 14 | 30 | 80% | 0.245 | 2.33 | 0.093 | 2.36 | 11.96 | 0.298 |
| 15 | 30 | 80% | 0.245 | 2.33 | 0.093 | 2.36 | 12.11 | 0.606 |
| 16 | 30 | 80% | 0.245 | 2.33 | 0.093 | 2.36 | 12.27 | 0.92 |

Example 3 = 77.54% in propyl acetate
GMA = 100%
Hycat = 5% in propyl acetate
4HTEMPO = 5% in propyl acetate
Irg 2959 = 10% in Methyl Ethyl Ketone
T115 = 70% in propyl acetate
DPHA = 100%

TABLE 8

Results

| Example | Lot | Filter | Polymer | Post Soak Filter + Polymer | % gel | Average | St dev | 15 min dwell | Average | Failure Mode |
|---|---|---|---|---|---|---|---|---|---|---|
| 13 | 1 | 0.237 | 0.061 | 0.263 | 43% | 41% | 1% | 3.66 | 3.36 | Cohesive |
|  | 2 | 0.244 | 0.06 | 0.268 | 40% |  |  | 3.06 |  |  |
|  | 3 | 0.25 | 0.064 | 0.276 | 41% |  |  |  |  |  |
| 14 | 1 | 0.244 | 0.058 | 0.269 | 43% | 44% | 1% | 2.81 | 2.71 | Cohesive |
|  | 2 | 0.244 | 0.067 | 0.273 | 43% |  |  | 2.65 |  |  |
|  | 3 | 0.238 | 0.063 | 0.266 | 44% |  |  | 2.66 |  |  |

TABLE 8-continued

Results

| | | % Gel Content | | | | | 90° Peel Adhesion to Flow Wrap | | |
| --- | --- | --- | --- | --- | --- | --- | --- | --- | --- |
| Example | Lot | Filter | Polymer | Post Soak Filter + Polymer | % gel | Average | St dev | 15 min dwell | Average | Failure Mode |
| 15 | 1 | 0.244 | 0.078 | 0.289 | 58% | 57% | 1% | 2.13 | 2.13 | Adhesive |
|  | 2 | 0.252 | 0.073 | 0.293 | 56% |  |  | 1.95 |  |  |
|  | 3 | 0.254 | 0.052 | 0.284 | 58% |  |  | 2.31 |  |  |
| 16 | 1 | 0.238 | 0.054 | 0.269 | 57% | 54% | 4% | 2.16 | 2.19 | Adhesive |
|  | 2 | 0.237 | 0.07 | 0.276 | 56% |  |  | 2.26 |  |  |
|  | 3 | 0.238 | 0.064 | 0.29 | 50% |  |  | 2.14 |  |  |

Example 17: Preparation of Segmented Acrylic Polymer Having Anhydride Functionality Using SFRP Agent as a Precursor to Acrylation (KH6-7)

An acrylic copolymer with reactive functionalities positioned in one segment adjacent to the polymer chain end is prepared as follows. Into a 1500 ml reactor equipped with a heating jacket, agitator, reflux condenser, feed tanks and nitrogen gas inlet there is charged 9.08 g of BlocBuilder MA (SFRP Agent). The reactor is then inerted with nitrogen for 1 hour at 0.5 litre/min. Monomers and solvents are added in the following amounts to a feed vessel and inerted with nitrogen for 1 hour at 0.5 litre/min. After inertion, the monomer and solvent mix was added to the reactor to generate the segment adjacent to the polymer chain ends.

89.41 g Butyl Acrylate
  89.41 g 2-EthylHexyl Acrylate
  16.36 g Maleic Anhydride
  177.83 g Propyl Acetate The reactor charge is heated to 70° C. (reactor Jacket to 81° C.) to initiate the BlocbuilderMA reaction with the initial acrylate Monomers. At 70° C., T=0 and hold below 85° C. for 30 minutes to complete the initial reaction. At this point, the BlocbuilderMA has added acrylate groups and is inert until heated above 100° C. At the end of the 30 minutes hold, the reaction is heated to reflux conditions (reactor jacket 130° C.) with a constant nitrogen purge. At 100° C., a 60 minutes hold is started in which the reaction will reach a reflux during this hold at approximately 112° C. This is to create the epoxy functional segment with a theoretical Mn of 8189 g/mol. During the 60 minute hold, a reagent feed mixture with an active nitrogen purge of 422.23 g propyl acetate, 804.71 g 2-ethylhexyl acrylate, and 804.71 g butyl acrylate is weighed into a feed vessel and inerted with nitrogen at 0.5 litre/minute. After the initial 60 minutes hold, the reagent feed is added over a period of sixty minutes to the reactor at a rate of 2 grams/minute. After the sixty minutes feed, the rate is ramped to 4.00 grams/min for 30 minutes. After the 30 minutes reed rate 2, the feed rate is increased to 8.00 grams/minute until the reagent feed is depleted. During the reagent feeds the temperature of the reaction is held at 115-122° C. The reaction conditions are maintained after completion of the reagent feed until a conversion of at least 90% of butyl acrylate and 2-ethylhexyl acrylate is achieved. This is to create the remainder of the non-anhydride functional segment adjacent to the anhydride functional segment at the end of the polymer. The total theoretical Mn of the non-anhydride functional segment is 67,531 g/mol. At this time, the polymer is cooled to 85° C. Once the polymer is 85° C., 1.80 g of tertiary amyl peroxy pivalate and 84.45 g propyl acetate are mixed in a 100 mL feed vessel and inerted for 15 minutes with nitrogen at 0.5 litre/minute. After inertion, the pivalate solution is added to the reactor over ninety minutes. At the completion of the pivalate feed, the reaction temperature is held between 85° C. and 90° C. for 1 hour. The resulting solution polymer is then cooled to ambient temperature and discharged from the reactor. The theoretical molecular weight was 75,722 g/mol Mn with 7 anhydride groups on one chain end.

The resulting solution polymer was isolated from solvent using rotary evaporation and evaluated for melt viscosity using a cone and plate fitted on a dynamic mechanical analysis rheometer.

Example 18: Preparation of Segmented Acrylic Polymer Having ENE Functionality Using Example 17 as a Precursor to Target 100% Acrylation with 4-Hydroxy Butyl Acrylate (JRL6-143)

An acrylic copolymer with reactive ENE functionalities positioned in one segment adjacent to the polymer chain end is prepared as follows. Into a 1500 ml reactor equipped with a heating jacket, agitator, reflux condenser, feed tanks and nitrogen gas inlet there is charged 545.22 g of Example 17 (anhydride precursor). Under agitation of 125 rpm, 0.14 g 4-Hydroxy TEMPO and 2.59 g of propyl acetate is added to the reactor and allowed to mix for 5 minutes. Next, 5.42 g of 4-Hydroxy Butyl Acrylate is added to the reactor and allowed to mix for 5 minutes. This mixture mixed over night at ambient temperature. The next day, the reactor charge is heated to 80° C. (reactor Jacket to 85° C.). Once at 80° C., T=0 and 0.41 g of MethaneSulfonic Acid and 3.70 g of ethyl acetate are added to the reactor. The mixture was held between 78-82° C. for 24 hours. 4-Hydroxy Butyl Acrylate conversion was monitored with gas chromatography over that hold time. After 24 hours, the polymer was cooled to ambient temperature and discharged. The resulting polymer has 7 maleic anhydride groups that were converted to ENE functionality to result in a pre-adhesive that is curable upon actinic/UV radiation.

Example 19: Pilot Scale Preparation of Segmented Acrylic Polymer Having ENE Functionality Using SFRP Agent (PP85-65)

An acrylic copolymer with ENE reactive functionalities positioned in one segment adjacent to the polymer chain end is prepared as follows. Into a 100 gallon reactor equipped with a heating jacket, agitator, reflux condenser, feed tanks and nitrogen gas inlet there is charged 1.53 lbs of BlocBuilder MA (SFRP Agent). The reactor is then inerted with nitrogen for 1 hour at 0.5 litre/min. Monomers and solvents are added in the following amounts to a feed vessel and inerted with nitrogen for 1 hour at 0.5 litre/min. After inertion, the monomer and solvent mix was added to the reactor to generate the segment adjacent to the polymer chain ends.

15.1 lbs Butyl Acrylate
15.1 lbs 2-EthylHexyl Acrylate
3.90 lbs Maleic Anhydride
27.5 lbs Propyl Acetate The reactor charge is heated to 70° C. (reactor Jacket to 80° C.) to initiate the BlocbuilderMA reaction with the initial acrylate Monomers. At 70° C., T=0 and hold below 85° C. for 30 minutes to complete the initial reaction. At this point, the BlocbuilderMA has added acrylate groups and is inert until heated above 100° C. At the end of the 30 minute hold, the reaction is heated to reflux conditions (reactor jacket 130° C.) with a constant nitrogen purge. At 100° C., T=0 and a hold is started in which the reaction will reach a reflux during this hold at approximately 114° C. This is to create the anhydride functional segment with a theoretical Mn of 8492 g/mol. During the hold, a reagent feed mixture with an active nitrogen purge of 47.9 lbs propyl acetate, 135.8 lbs 2-ethylhexyl acrylate, and 135.8 lbs butyl acrylate is weighed into a feed vessel. After the initial monomer conversion is >60% converted, the reagent feed is added over a period of sixty minutes to the reactor through a Nitrogen diffuser (0.5 L/min) at a rate of 0.95 lbs/minute. After the sixty minutes feed, the rate is ramped to 1.18 lbs/min for 60 minutes. After the 60 minutes reed rate 2, the feed rate is increased to 1.28 lbs/minute until the reagent feed is depleted (~150 minutes). During the reagent feeds the temperature of the reaction is held at 115-122° C. The reaction conditions are maintained after completion of the reagent feed until a conversion of at least 90% of butyl acrylate and 2-ethylhexyl acrylate is achieved. This is to create the remainder of the non-anhydride functional segment adjacent to the anhydride functional segment at the end of the polymer. The total theoretical Mn of the non-anhydride functional segment is 67,633 g/mol. At this time, the polymer is cooled to 85° C. Once the polymer is 85° C., 0.30 lbs of tertiary amyl peroxy pivalate and 13.4 lbs propyl acetate are mixed in feed vessel and added to the reactor over thirty minutes. At the completion of the pivalate feed, the reaction temperature is held between 85° C. and 90° C. for 2 hours.

After the 2 hour hold, Nitrogen purge is turned off and 0.0769 lbs of 4-Hydroxy TEMPO, 5.7 lbs of 4-Hydroxy Butyl Acrylate are mixed until homogeneous. Once mixed, the TEMPO and HBA mixture is added to the reactor and allowed to mix under agitation for 5 minutes. Once mixed, 0.308 lbs of Methane Sulfonic Acid is added to the reactor along with 1.7 lbs of propyl acetate rinse. The reaction is held at 85° C. until greater than 80% of the HBA has been converted. Conversion is monitored by gas chromatography. Once the HBA conversion is above 80%, an additional 0.154 lbs of 4-Hydroxy TEMPO and 19.2 lbs of n,n-Dimethyltetradecylamine (ADMA 14) are added to the reactor. Lastly, 2.50 lbs of Esacure one is dissolved in 25.00 lbs of propyl acetate and added to the reactor and allowed to mix. The resulting solution polymer is then isolated via pot stripping and discharged from the reactor. The theoretical molecular weight was 76,125 g/mol Mn with 10 anhydride groups on one chain end that were converted to ENE functionality to result in a pre-adhesive that is curable upon actinic/UV radiation.

Example 20: Formulation of Example 19—Pilot Scale Preparation of Segmented Acrylic Polymer Having ENE Functionality Using SFRP Agent with 7.5 Parts Per Hundred Tackifier (AK6-33)

The terpene phenolic resin tackifier used was Dertophene T115 purchased from DRT.

TABLE 9

| | | Performance | | | |
|---|---|---|---|---|---|
| | | Example 19 | Example 20 | Commercial Control | Commercial Control |
| | Solids | >99% | >99% | 39% | 26% |
| | Coatweight (gsm) | 13.5 | 13.7 | 17.5 | 17.5 |
| | Tackifier | 0 | 7.5 | 0 | 0 |
| 90° Peel Adhesion | 1 hr glass | 0.29 | 0.56 | 0.71 | 0.67 |
| | 24 hr glass | 0.30 | 0.66 | 0.80 | 1.00 |
| | 1 hr PP | 0.31 | 0.47 | 0.61 | 0.41 |
| | 24 hr PP | 0.44 | 0.54 | 0.84 | 0.72 |
| | 1 hr PET | 0.67 | 1.20 | 0.96 | 0.54 |
| | 24 hr PET | 0.82 | 1.30 | 1.08 | 1.01 |

Example 21: Preparation of Segmented Acrylic Polymer Having Alcohol Functionality Using SFRP Agent as a Precursor to Acrylation (KH5-39) (KH7-31)

An acrylic copolymer with alcohol reactive functionalities positioned in the segment adjacent to the polymer chain ends is prepared as follows. Into a 1500 ml reactor equipped with a heating jacket, agitator, reflux condenser, feed tanks and nitrogen gas inlet there is charged 10.55 g of BlocBuilder MA (SFRP Agent). The reactor is then inerted with nitrogen for 1 hour at 0.5 litre/min. Monomers and solvents are added in the following amounts to a feed vessel and inerted with nitrogen for 1 hour at 0.5 litre/min. After inertion, the monomer and solvent mix was added to the reactor to generate the segment adjacent to the polymer chain ends.

99.73 g Butyl Acrylate
38.78 g Methyl Acrylate
7.98 g 4-Hydroxy Butyl Acrylate
150.00 g Propyl Acetate The reactor charge is heated to 70° C. (reactor Jacket to 81° C.) to initiate the BlocbuilderMA reaction with the initial acrylate Monomers. At 70° C., T=0 and hold below 85 C for 30 minutes to complete the initial reaction. At this point, the BlocbuilderMA has added acrylate groups and is inert until heated above 100° C. At the end of the 30 minute hold, the reaction is heated to reflux conditions (reactor jacket 130° C.) with a constant nitrogen purge. At 100° C., a 60 minute hold is started in which the reaction will reach a reflux during this hold at approximately 112° C. This is to create the alcohol functional segment with a theoretical Mn of 5,290 g/mol. During the 60 minute hold, a reagent feed mixture with an active nitrogen purge of 250.00 g propyl acetate, 349.05 g Methyl Acrylate, and 897.55 g Butyl Acrylate is weighed into a feed vessel and inerted with nitrogen at 0.5 litre/minute. After the initial 60 minute hold, the reagent feed is added over a period of sixty minutes to the reactor at a rate of 2 grams/minute. After the sixty minute feed, the rate is ramped to 4.00 grams/min for 30 minutes. After the 30 minute reed rate 2, the feed rate is increased to 8.00 grams/minute until the reagent feed is depleted. During the reagent feeds the temperature of the reaction is held at 115-122° C. The reaction conditions are maintained after completion of the reagent feed until the residual monomer is less than 1%. This is to create the remainder of the non-alcohol functional segment adjacent to the alcohol functional segment at the end of the polymer. The total theoretical Mn of the non-alcohol functional segment is 45,019 g/mol. The resulting solution polymer is then cooled to ambient temperature and discharged from the reactor. The theoretical molecular weight was 50,309 g/mol Mn with 2 alcohol groups on one chain end.

Examples 22-26—Formulations of Example 21 with D-200 Di-Isocyano Acrylate Preparation of Segmented Acrylic Pre Adhesive Having ENE Functionality Using SFRP Agent (AK3-27)

Example 21 was formulated with D200 provided by Allnex at various molar ratios of the isocyante to alcohol groups and Dibutyl Tin Dilaurate (DBTDL) provided by Sigma Aldrich.

TABLE 10

| Example | Base Polymer | Amt (g) | Dry (g) | Ratio NCO to OH | Grams D200 | D200 soln AMT | DBTDL soln AMT |
|---|---|---|---|---|---|---|---|
| 22 | Example 21 | 31.86 | 26.26 | 1/2 | 0.57 | 5.72 | 1.31 |
| 23 | Example 21 | 30.95 | 25.51 | 1/3 | 0.37 | 3.70 | 1.28 |
| 24 | Example 21 | 31.75 | 26.17 | 1/4 | 0.28 | 2.85 | 1.31 |
| 25 | Example 21 | 30.94 | 25.50 | 1/5 | 0.22 | 2.22 | 1.28 |
| 26 | Example 21 | 30.71 | 25.31 | 1/6 | 0.18 | 1.84 | 1.27 |

DBTDL = 1% in toluene
D200 = 10% in toluene
Ex 21 = 8.42% in propyl acetate

TABLE 11

Results

65 C.° for 1 week

| Example | D200 to OH Ratio | Aged/Unaged | UV Cured? | % gel | |
|---|---|---|---|---|---|
| 22 | 1/2 | Unaged | No | 37.88% | * no UV initiator added |
| 23 | 1/3 | Unaged | No | 32.74% | 1. coated and dried |
| 24 | 1/4 | Unaged | No | 5.60% | 2. % gel measured |
| 25 | 1/5 | Unaged | No | 2.87% | |
| 26 | 1/6 | Unaged | No | 0.20% | |
| 22 | 1/2 | Aged | No | 46.62% | * no UV initiator added |
| 23 | 1/3 | Aged | No | 28.03% | 1. coated and dried |
| 24 | 1/4 | Aged | No | 3.23% | 2. coatings heat aged |
| 25 | 1/5 | Aged | No | 3.79% | 3. % gel measured |
| 26 | 1/6 | Aged | No | 4.57% | |

Examples 27-31—Formulations of Examples 22-26 with Irgacure 4265 Photoinitiator for UV Curing of the Pre-Adhesives (AK3-39)

Examples 22-26 were formulated with Irgacure 4265 provided by BASF at 1% on dry resin for curing studies.

TABLE 12

| example | base polymer | amt (g) | % tsc | DRY (g) | dry 4265 (g) | % on dry |
|---|---|---|---|---|---|---|
| 27 | example 22 | 28.98 | 60% | 17.388 | 0.17 | 1.0% |
| 28 | example 23 | 29.7 | 60% | 17.82 | 0.18 | 1.0% |
| 29 | example 24 | 30.5 | 60% | 18.3 | 0.18 | 1.0% |
| 30 | example 25 | 27.41 | 60% | 16.446 | 0.16 | 1.0% |
| 31 | example 26 | 29.22 | 60% | 17.532 | 0.17 | 1.0% |

TABLE 13

Results

65 C.° for 1 week

| Example | D200 to OH Ratio | Aged/Unaged | UV Cured? | % gel | |
|---|---|---|---|---|---|
| 27 | 1/2 | Unaged | Yes | 58.40% | * UV initiator added |
| 28 | 1/3 | Unaged | Yes | 41.39% | 1. coated and dried |
| 29 | 1/4 | Unaged | Yes | 23.58% | 2. UV cured right |
| 30 | 1/5 | Unaged | Yes | 16.89% | after coating |
| 31 | 1/6 | Unaged | Yes | 4.30% | 3. % gel measured |
| 27 | 1/2 | Aged | Yes | 66.29% | * UV initiator added |
| 28 | 1/3 | Aged | Yes | 51.94% | 1. coated and dried |
| 29 | 1/4 | Aged | Yes | 39.73% | 2. UV cured right |
| 30 | 1/5 | Aged | Yes | 32.85% | after coating |
| 31 | 1/6 | Aged | Yes | 11.02% | 3. coatings heat aged |
|  |  |  |  |  | 4. % gel measured |
| 27 | 1/2 | Aged | Yes | 55.39% | * UV initiator added |
| 28 | 1/3 | Aged | Yes | 37.58% | 1. wet samples heat aged |
| 29 | 1/4 | Aged | Yes | 19.60% | 2. coated and dried |
| 30 | 1/5 | Aged | Yes | 10.52% | 3. UV cured |
| 31 | 1/6 | Aged | Yes | 4.23% | 4. % gel measured |
| 27 | 1/2 | Aged | No | 39.53% | * UV initiator added |
| 28 | 1/3 | Aged | No | 17.70% | 1. wet samples heat aged |
| 29 | 1/4 | Aged | No | 3.71% | 2. NO UV CURE |
| 30 | 1/5 | Aged | No | 4.76% | 3. % gel measured |
| 31 | 1/6 | Aged | No | N/A | |

Example 32: Preparation of Segmented Acrylic Polymer Having Alcohol Functionality Using SFRP Agent as a Precursor to Acrylation (KH7-31)

An acrylic copolymer with alcohol reactive functionalities positioned in the segment adjacent to the polymer chain ends is prepared as follows. Into a 1500 ml reactor equipped with a heating jacket, agitator, reflux condenser, feed tanks and nitrogen gas inlet there is charged 4.66 g of BlocBuilder MA (SFRP Agent). The reactor is then inerted with nitrogen for 1 hour at 0.5 litre/min. Monomers and solvents are added in the following amounts to a feed vessel and inerted with nitrogen for 1 hour at 0.5 litre/min. After inertion, the monomer and solvent mix was added to the reactor to generate the segment adjacent to the polymer chain ends.

61.13 g Butyl Acrylate
61.16 g 2-Ethyl Hexyl Acrylate
3.52 g 4-Hydroxy Butyl Acrylate
121.58 g Propyl Acetate The reactor charge is heated to 70° C. (reactor Jacket to 81° C.) to initiate the BlocbuilderMA reaction with the initial acrylate Monomers. At 70° C., T=0 and hold below 85° C. for 30 minutes to complete the initial reaction. At this point, the BlocbuilderMA has added acrylate groups and is inert until heated above 100° C. At the end of the 30 minute hold, the reaction is heated to reflux conditions (reactor jacket 130° C.) with a constant nitrogen purge. At 100° C., a 75 minute hold is started in which the reaction will reach a reflux during this hold at approximately 112° C. This is to create the alcohol functional segment with a theoretical Mn of 10,283 g/mol. During the 75 minute hold, a reagent feed mixture with an active nitrogen purge of 288.67 g propyl acetate, 550.17 g 2-Ethyl Hexyl Acrylate, and 550.17 g Butyl Acrylate is weighed into a feed vessel and inerted with nitrogen at 0.5 litre/minute. After the initial 75 minute hold, the reagent feed is added over a period of sixty minutes to the reactor at a rate of 2 grams/minute. After the sixty minute feed, the rate is ramped to 6.00 grams/min for 30 minutes. After the 30 minute reed rate 2, the feed rate is increased to 9.00 grams/minute until the reagent feed is depleted. During the reagent feeds the temperature of the reaction is held at 115-122° C. The reaction conditions are maintained after completion of the reagent feed until a conversion of at least 90% of butyl acrylate and 2-ethylhexyl acrylate is achieved. This is to create the remainder of the non-alcohol functional segment adjacent to the alcohol functional segment at the end of the polymer. The total theoretical Mn of the non-alcohol functional segment is 89,963 g/mol. At this time, the polymer is cooled to 85° C. Once the polymer is 85° C., 2.46 g of tertiary amyl peroxy pivalate and 118.54 g propyl acetate are mixed in a 100 mL feed vessel and inerted for 15 minutes with nitrogen at 0.5 litre/minute. After inertion, the pivalate solution is added to the reactor over thirty minutes. At the completion of the pivalate feed, the reaction temperature is held between 85° C. and 90° C. for at least 2 hours. The resulting solution polymer is then cooled to ambient temperature and discharged from the reactor. The theoretical molecular weight was 100,247 g/mol Mn with 2 alcohol groups on one chain end.

Examples 33-35—Formulations of Example 32 with D-200XP Di-Isocyano Acrylate and Multifunctional Acrylates Preparation of Segmented Acrylic Pre Adhesive Having ENE Functionality Using SFRP Agent (AK7-35)

The multifunctional acrylate used was Pentaerythritol Tetra Acrylate (PETTA) purchased from Sigma Aldrich.

D-200XP was provided by Allnex and added to each blend at an NCO to OH ratio of 1 to 4.

Dibutyl Tin Dilaurate (DBTDL) was purchased from Sigma Aldrich.

4-Hydroxy TEMPO was purchased from Sigma Aldrich.

Esacure One was purchased from IGM Resins.

TABLE 14

| example | EXAMPLE 32 (g) | NCO to OH ratio | D200 (g) | DBTDL (g) | MFA (g) | Photoinitiator (g) | 4 Hydroxy TEMPO (g) |
|---|---|---|---|---|---|---|---|
| 33 | 30.37 | 1 to 4 | 0.125 | 0.226 | 0.622 | 2.26 | 0.113 |
| 34 | 24.14 | 1 to 4 | 0.099 | 0.18 | 0.54 | 1.8 | 0.09 |
| 35 | 32.01 | 1 to 4 | 0.132 | 0.239 | 0.6 | 2.38 | 0.12 |

D200 = 100%
DBTDL = 10% in Toluene
MF4 = 50% in Toluene
PI = 100%
4HTEMPO = 5% in Propyl Acetate

TABLE 15

Results

| | | Example 33 | Example 34 | Example 35 | Commercial Control | Commercial Control |
|---|---|---|---|---|---|---|
| | Solids | >99% | >99% | >99% | 39% | 26% |
| | Coatweight (gsm) | 12.2 | 12.2 | 10.9 | 17.5 | 17.5 |
| | MFA | 1.25 | 1.375 | 1.5 | 0 | 0 |
| 90° Peel Adhesion | 1 hr glass | 0.5 | 0.64 | 0.53 | 0.71 | 0.67 |
| | 24 hr glass | 0.54 | 0.70 | 0.57 | 0.80 | 1.00 |
| | 1 hr PP | 0.58 | 0.54 | 0.60 | 0.61 | 0.41 |
| | 24 hr PP | 0.59 | 0.56 | 0.61 | 0.84 | 0.72 |
| | 1 hr PET | 1.01 | 0.87 | 1.00 | 0.96 | 0.54 |
| | 24 hr PET | 1.27 | 1.13 | 1.25 | 1.08 | 1.01 |

Many other benefits will no doubt become apparent from future application and development of this technology.

Further examples consistent with the present teachings are set out in the following clauses.

Clause 1. A composition comprising a precursor and a reacting agent, the precursor comprising at least one acrylic block copolymer, the at least one acrylic block copolymer comprising, a first reactive segment of controlled molecular weight and position that comprises at least one monomer having a functional group selected from the group consisting of a self-reactive functional group, a reactive functional group, a non-reactive functional group, and combinations thereof; and, a second segment of controlled molecular weight and position that includes at least one monomer having a functional group selected from the group consisting of a reactive functional group, a non-reactive functional group, and combinations thereof; wherein at least one of the functional groups of the at least one acrylic block copolymer can undergo a post-polymerization functionalization reaction with the reacting agent to make the at least one acrylic block copolymer crosslinkable upon exposure to an actinic radiation, wherein the at least one acrylic block copolymer does not contain ethylenic unsaturation.

Clause 2. The composition of clause 1, wherein the at least one acrylic block copolymer is not crosslinkable upon exposure to the actinic radiation.

Clause 3. The composition of any one of clauses 1 or 2, wherein the reacting agent comprises at least one of a double bond and a functional group, the functional group being capable of reacting with at least one of the functional group of the at least one acrylic block copolymer.

Clause 4. The composition of any one of clauses 1-3, wherein the post-polymerization functionalization reaction is an acrylation reaction.

Clause 5. The composition of any one of clauses 1-4, wherein the post-polymerization functionalization reaction produces a n ethylenically unsaturated bond on the at least one acrylic block copolymer.

Clause 6. The composition of clause 5, wherein the ethylenically unsaturated bond is a double bond.

Clause 7. The composition of any one of clauses 1-6, wherein the precursor forms a pre-adhesive composition after the post-polymerization functionalization reaction of the at least one acrylic block copolymer.

Clause 8. The composition of clause 7, wherein the pre-adhesive is at least partially crosslinkable upon exposure to the actinic radiation to form an adhesive.

Clause 9. The composition of clause 8, wherein the adhesive is a pressure sensitive adhesive.

Clause 10. The composition of any of clauses 1-9, wherein the actinic radiation is at least one of UV radiation and electron beam radiation.

Clause 11. The composition of any one of clauses 1-10, wherein the composition is free of solvents.

Clause 12. The composition of any one of clauses 1-11, wherein at least one of the precursor and pre-adhesive exhibits a viscosity within a range of from about 1,000 cps to about 80,000 cps at a temperature within a range of from about 110° C. to about 180° C.

Clause 13. The composition of any one of clauses 1-11, wherein at least one of the precursor and pre-adhesive exhibits a viscosity within a range of from about 30,000 cps to about 40,000 cps at a temperature within a range of from about 120° C. to about 140° C.

Clause 14. The composition of any one of clauses 1-11, wherein at least one of the precursor and pre-adhesive exhibits a viscosity within a range of from about 40,000 cps to about 50,000 cps at a temperature within a range of from about 120° C. to about 140° C.

Clause 15. The composition of any one of clauses 1-11, wherein at least one of the precursor and pre-adhesive exhibits a viscosity within a range of from about 1,000 cps to about 15,000 cps at a temperature within a range of from about 110° C. to about 130° C.

Clause 16. The composition of any one of clauses 1-15, wherein the pre-adhesive prior to activation is solvent free and exhibits less than about 7.5% gel.

Clause 17. The composition of any one of clauses 1-16, wherein the pre-adhesive prior to activation exhibits less than about 7.5% gel at about 99% or more solids.

Clause 18. The composition of any one of clauses 1-16, wherein the pre-adhesive prior to activation exhibits less than about 7.5% gel at 100% solids.

Clause 19. The composition of any one of clauses 1-18, wherein the first reactive segment comprises at least one monomer having a non-reactive functional group and at least one polymerizable comonomer having a crosslinkable functionality, the crosslinkable functionality comprising a self-reactive functional group and a reactive functional group.

Clause 20. The composition of any one of clauses 1-18, wherein the first reactive segment comprises at least one monomer having a non-reactive functional group and at least one polymerizable comonomer having a crosslinkable functionality, the crosslinkable functionality comprising a self-reactive functional group.

Clause 21. The composition of any one of clauses 1-18, wherein the first reactive segment comprises at least one monomer having a non-reactive functional group and at least one polymerizable comonomer having a crosslinkable functionality, the crosslinkable functionality comprising a reactive functional group.

Clause 22 The composition of any one of clauses 1-21, wherein the second segment comprises at least one monomer having a non-reactive functional group and at least one monomer having a reactive functional group.

Clause 23. The composition of any one of clauses 1-21, wherein the second segment includes at least one monomer having a non-reactive functional group.

Clause 24. The composition of any one of clauses 1-23, wherein the at least one monomer having a non-reactive functional group within the first reactive segment is the same type of monomer having a non-reactive functional group present in the second segment.

Clause 25. The composition of any one of clauses 1-24, wherein the at least one monomer having a reactive functional group within the first reactive segment is the same type of monomer having a reactive functional group present in the second segment.

Clause 26. The composition of any one of clauses 1-25, wherein the functional group of the at least one acrylic block copolymer that undergoes the post-polymerization reaction is a different type of functional group from the functional group of the reacting agent.

Clause 27. The composition of any one of clauses 1-25, wherein the functional group of the at least one acrylic block copolymer that undergoes the post-polymerization reaction is the same type of functional group as the functional group of the reacting agent.

Clause 28. The composition of any one of clauses 1-27, wherein the at least one monomer having a reactive functional group includes at least one functionalized monomer derived from the formula (I):

where $R_3$ is H or $CH_3$ and $R_4$ is X, where X comprises a functional group capable of crosslinking, wherein the functional group includes at least one functional group selected from the group consisting of hydroxyl, carboxyl, carbonyl, carbonate ester, isocyanate, epoxy, vinyl, amine, amide, imide, anhydride, thiol, acid, acrylamide, acetoacetyl groups, alkoxymethylol, cyclic ether groups, and combinations thereof.

Clause 29. The composition of any one of clauses 1-28, wherein the at least one monomer having a non-reactive functional group includes at least one monomer derived from the formula (I):

where $R_3$ is H or $CH_3$ and $R_4$ is a branched or unbranched, saturated alkyl group having 4 to 14 carbon atoms.

Clause 30. The composition of any one of clauses 1-29, wherein the at least one monomer having a non-reactive functional group is derived from $C_1$ to about $C_{20}$ alkyl, aryl, or cyclic acrylates or $C_1$ to about $C_{20}$ alkyl, aryl, or cyclic methacrylates.

Clause 31. The composition of any one of clauses 1-30, wherein the first reactive segment comprises about 40% to about 99% by weight of the at least one monomer having a non-reactive functional group.

Clause 32. The composition of any one of clauses 1-31, wherein the at least one monomer having a non-reactive functional group is non-reactive with at least one of the self-reactive functional group and the reactive functional group.

Clause 33. The composition of any one of clauses 1-32, wherein the self-reactive functional group is selected from the group consisting of silyl, silane, anhydride, epoxy, alkoxymethylol, cyclic ethers, acetoacetyl groups, isocyanate, cyclic esters, and thiol.

Clause 34. The composition of any one of clauses 1-33, wherein the reactive functional group is selected from the group consisting of hydroxyl, carboxyl, carbonyl, carbonate ester, isocyanate, epoxy, vinyl, amine, amide, imide, anhydride, thiol, acid, acrylamide, acetoacetyl groups, alkoxymethylol, cyclic ether groups, and combinations thereof.

Clause 35. The composition of any one of clauses 1-34, wherein the functional group of the reacting agent is selected from the group consisting of hydroxyl, carboxyl, carbonyl, carbonate ester, isocyanate, epoxy, vinyl, amine, amide, imide, anhydride, thiol, acid, acrylamide, acetoacetyl groups, alkoxymethylol, cyclic ether groups, and combinations thereof.

Clause 36. The composition of any one of clauses 1-35, wherein the precursor has a polydispersity greater than 3.0.

Clause 37. The composition of any one of clauses 1-36, wherein at least one of the precursor and pre-adhesive composition has a number average molecular weight (Mn) within a range of from about 5,000 g/mole to about 300,000 g/mole.

Clause 38. The composition of any one of clauses 1-37, wherein the at least one acrylic block copolymer comprises two first reactive segments A and one second segment B.

Clause 39. The composition of clause 38, wherein the segments A are positioned on either side of the middle segment B on the polymer chain to define an ABA structure.

Clause 40. The composition of any one of clauses 1-37, wherein the at least one acrylic block copolymer comprises two second segments B and one first reactive segment A.

Clause 41. The composition of clause 40, wherein the blocks B are positioned on either side of the middle block A on the polymer chain to define a BAB structure.

Clause 42. The composition of any one of clauses 1-41, wherein the first reactive segment and the second segment are molecularly miscible before cure or prior to crosslinking as expressed by their properties in the bulk state that are indicative of a single phase polymer.

Clause 43. The composition of any one of clauses 1-42, wherein at least one of the precursor and pre-adhesive composition is a homogeneous (single phase) polymer at a temperature range of from 15° C. to 200° C.

Clause 44. The composition of any one of clauses 1-42, wherein at least one of the precursor and pre-adhesive composition is a homogeneous (single phase) liquid polymer at a temperature range of from 15° C. to 200° C.

Clause 45. The composition of any one of 1-44, wherein the composition further includes at least one component selected from the group consisting of pigments, tackifiers, plasticizers, fillers, diluents, inhibitors, sensitizers, crosslinking agents, initiators, actinic radiation initiators, catalysts, antioxidants, pH controllers, medicaments, bactericides, growth factors, wound healing components, deodorants, perfumes, antimicrobials, fungicides, cutting agents, flame retardants, and combinations thereof.

Clause 46. The composition of any one of 1-45, wherein the composition further includes a multifunctional (meth) acrylate.

Clause 47. The composition of any one of clauses 8 and 9, wherein the adhesive exhibits an elastic/storage modulus (G') of less than the Dahlquist criterion value of $3 \times 10^6$ dynes/cm$^2$ ($3 \times 10^5$ Pa) at room temperature as determined by dynamic mechanical analysis.

Clause 48. The composition of any one of clauses 8 and 9, wherein the adhesive exhibits a plateau shear modulus at 25° C. and 1 radian per second that is between $1 \times 10^5$ and $6 \times 10^6$ dynes/cm$^2$ as determined by dynamic mechanical analysis.

Clause 49. The composition of any one of clauses 8, 9, 47 and 48, wherein the glass transition temperature (Tg) of the adhesive composition is within a range of from about 15° C. to about −115° C.

Clause 50. The composition of any one of 1-49, wherein the glass transition temperature (Tg) of the precursor is within a range of from about 15° C. to about −115° C.

Clause 51. A composition comprising the precursor of any one of clauses 1-50; and a monomer having an acrylating functional group, wherein at least one of the functional groups of the at least one acrylic block copolymer can undergo a post-polymerization functionalization reaction with the acrylating functional group to make the at least one acrylic block copolymer crosslinkable upon exposure to an actinic radiation.

Clause 52. A method of forming a pre-adhesive composition curable upon exposure to actinic radiation, the method comprising providing the precursor of any one of clauses 1-50, modifying at least a portion of the functional groups of the at least one acrylic block copolymer to form the pre-adhesive composition, wherein the modifying produces ethylenically unsaturated bonds on the at least one acrylic copolymer that upon exposure to actinic radiation, effect curing of the pre-adhesive composition to thereby produce an adhesive composition.

Clause 53. The method of clause 52 wherein the adhesive is a pressure sensitive adhesive.

Clause 54. An adhesive composition produced by the method of clause 52.

Clause 55. The adhesive composition of clause 54, wherein the adhesive is a pressure sensitive adhesive.

Clause 56. A method of forming an adhesive composition comprising providing a pre-adhesive composition comprising the precursor of any one of clauses 1-50, wherein at least a portion of the functional groups of the pre-adhesive composition include ethylenically unsaturated bonds, exposing the pre-adhesive composition to actinic radiation to thereby at least partially cure the pre-adhesive composition and form the adhesive composition.

Clause 57. The method of clause 56 wherein the ethylenically unsaturated bonds are produced by modifying at least a portion of the functional groups of the at least one acrylic block copolymer.

Clause 58. The method of clause 56 or 57 wherein the adhesive is a pressure sensitive adhesive.

Clause 59. A composition consisting of the precursor of any one of clauses 1-50; a reacting agent, a photoinitiator, and optionally a catalyst, wherein at least one of the functional groups of the at least one acrylic block copolymer can undergo a post-polymerization functionalization reaction with the reacting agent to make the at least one acrylic block copolymer crosslinkable upon exposure to an actinic radiation, wherein the at least one acrylic block copolymer does not contain ethylenic unsaturation.

Clause 60 The composition of clause 59, wherein the reacting agent comprises at least one of a double bond and a functional group, the functional group being capable of reacting with at least one of the functional groups of the at least one acrylic block copolymer.

Clause 61. The composition of clause 60, wherein the functional group of the reacting agent is selected from the group consisting of hydroxyl, carboxyl, carbonyl, carbonate ester, isocyanate, epoxy, vinyl, amine, amide, imide, anhydride, thiol, acid, acrylamide, acetoacetyl groups, alkoxymethylol, cyclic ether groups, and combinations thereof.

Clause 62. The composition of any one of clauses 59-61, wherein the functional group of the at least one acrylic block copolymer that undergoes the post-polymerization reaction is a different type of functional group from the functional group of the reacting agent.

Clause 63. The composition of any one of clauses 59-61, wherein the functional group of the at least one acrylic block copolymer that undergoes the post-polymerization reaction is the same type of functional group as the functional group of the reacting agent.

Clause 64. A pre-adhesive comprising the precursor of any one of clauses 1-50 comprising the post-polymerization functionalized at least one acrylic block copolymer.

Clause 65. A pressure sensitive adhesive comprising at least a partially crosslinked pre-adhesive of clause 64.

All patents, applications, and standards noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A composition comprising:
a precursor and a reacting agent,
the precursor comprising at least one acrylic block copolymer, the at least one acrylic block copolymer comprising
a first reactive segment of controlled molecular weight and position that comprises at least one monomer having a functional group selected from the group consisting of a self-reactive functional group, a reactive functional group, a non-reactive functional group, and combinations thereof; and
a second segment of controlled molecular weight and position that includes at least one monomer having a functional group selected from the group consisting of a reactive functional group, a non-reactive functional group, and combinations thereof;
wherein at least one of the functional groups of the at least one acrylic block copolymer can undergo a post-polymerization functionalization reaction with the reacting agent to make the at least one acrylic block copolymer crosslinkable upon exposure to an actinic radiation,
wherein the at least one acrylic block copolymer does not contain ethylenic unsaturation prior to the post-polymerization functionalization reaction, and
wherein the composition is free of solvents;
wherein the self-reactive functional group is selected from the group consisting of silyl, silane, epoxy, cyclic ethers, isocyanate, cyclic esters, and thiol;
wherein the reactive functional group is selected from the group consisting of carbonyl, carbonate ester, isocyanate, epoxy, vinyl, thiol, cyclic ether groups, and combinations thereof; and
wherein the non-reactive functional group is derived from C1 to about C20 alkyl, aryl, or cyclic acrylates or C1 to about C20 alkyl, aryl, or cyclic methacrylates; and
wherein the reacting agent comprises at least one of a double bond and a functional group selected from the group consisting of hydroxyl, carboxyl, carbonyl, carbonate ester, isocyanate, epoxy, vinyl, amine, amide, imide, anhydride, thiol, acid, acetoacetyl groups, alkoxymethylol, cyclic ether groups, and combinations thereof.

2. The composition of claim 1, wherein the at least one acrylic block copolymer is not crosslinkable upon exposure to the actinic radiation.

3. The composition of claim 1, wherein the functional group of the reacting agent being capable of reacting with at least one of the functional group of the at least one acrylic block copolymer.

4. The composition of claim 1, wherein the post-polymerization functionalization reaction is an acrylation reaction.

5. The composition of claim 1, wherein the post-polymerization functionalization reaction produces an ethylenically unsaturated bond on the at least one acrylic block copolymer.

6. The composition of claim 5, wherein the ethylenically unsaturated bond is a double bond.

7. The composition of claim 1, wherein the precursor forms a pre-adhesive composition after the post-polymerization functionalization reaction of the at least one acrylic block copolymer.

8. The composition of claim 7, wherein the pre-adhesive is at least partially crosslinkable upon exposure to the actinic radiation to form an adhesive.

9. The composition of claim 8, wherein the adhesive is a pressure sensitive adhesive.

10. The composition of claim 1, wherein the actinic radiation is at least one of UV radiation and electron beam radiation.

11. The composition of claim 1, wherein at least one of the precursor and pre-adhesive exhibits a viscosity within a range of from about 1,000 cps to about 80,000 cps at a temperature within a range of from about 110° C. to about 180° C.

12. The composition of claim 1, wherein the functional group of the at least one acrylic block copolymer that undergoes the post-polymerization reaction is a different type of functional group from the functional group of the reacting agent.

13. The composition of claim 1, wherein the functional group of the at least one acrylic block copolymer that undergoes the post-polymerization reaction is the same type of functional group as the functional group of the reacting agent.

14. The composition of claim 1, wherein the first reactive segment comprises about 40% to about 99% by weight of the at least one monomer having a non-reactive functional group.

15. The composition of claim 1, wherein the first reactive segment and the second segment are molecularly miscible before cure or prior to crosslinking as expressed by their properties in the bulk state that are indicative of a single phase polymer.

16. The composition of claim 1, wherein at least one of the precursor and pre-adhesive composition is a homogeneous (single phase) polymer at a temperature range of from 15° C. to 200° C.

17. The composition of claim 1, wherein the composition further includes at least one component selected from the group consisting of pigments, tackifiers, plasticizers, fillers, diluents, inhibitors, sensitizers, crosslinking agents, initiators, actinic radiation initiators, catalysts, antioxidants, pH controllers, medicaments, bactericides, growth factors, wound healing components, deodorants, perfumes, antimicrobials, fungicides, cutting agents, flame retardants, and combinations thereof.

18. The composition of claim 8, wherein the glass transition temperature (Tg) of the adhesive composition is within a range of from about 15° C. to about -115° C.

19. The composition of claim 1, wherein the glass transition temperature (Tg) of the precursor is within a range of from about 15° C. to about -115° C.

20. A method of forming a pre-adhesive composition curable upon exposure to actinic radiation, the method comprising:
providing the precursor of claim 1;
modifying at least a portion of the functional groups of the at least one acrylic block copolymer to form the pre-adhesive composition, wherein the modifying produces ethylenically unsaturated bonds on the at least one acrylic copolymer that upon exposure to actinic radiation, effect
curing of the pre-adhesive composition to thereby produce an adhesive composition,
wherein the composition is free of solvents.

21. The method of claim 20 wherein the adhesive is a pressure sensitive adhesive.

22. An adhesive composition produced by the method of claim 21.

23. The adhesive composition of claim 22, wherein the adhesive is a pressure sensitive adhesive.

24. A method of forming an adhesive composition comprising:
providing a pre-adhesive composition comprising the precursor of claim 1, wherein at least a portion of the functional groups of the pre-adhesive composition include ethylenically unsaturated bonds;
exposing the pre-adhesive composition to actinic radiation to thereby at least partially cure the pre-adhesive composition and form the adhesive composition,
wherein the pre-adhesive prior to activation exhibits less than about 7.5% gel at about 99% or more solids.

25. The method of claim 24 wherein the ethlyenically unsaturated bonds are produced by modifying at least a portion of the functional groups of the at least one acrylic block copolymer.

26. The method of claim 24 wherein the adhesive is a pressure sensitive adhesive.

27. A composition consisting of:
the precursor of claim 1;
a reacting agent,
a photoinitiator, and optionally
a catalyst,
wherein at least one of the functional groups of the at least one acrylic block copolymer can undergo a post-polymerization functionalization reaction with the reacting agent to make the at least one acrylic block copolymer crosslinkable upon exposure to an actinic radiation,
wherein the at least one acrylic block copolymer does not contain ethylenic unsaturation prior to the post-polymerization functionalization reaction, and
wherein the composition is free of solvents.

28. A pre-adhesive comprising the precursor of claim 1 comprising the post-polymerization functionalized at least one acrylic block copolymer.

29. A pressure sensitive adhesive comprising at least a partially crosslinked pre-adhesive of claim 28.

30. A composition comprising:
a precursor and a reacting agent,
the precursor comprising at least one acrylic block copolymer, the at least one acrylic block copolymer comprising
a first reactive segment of controlled molecular weight and position that comprises at least one monomer having a functional group selected from the group consisting of a self-reactive functional group, a reactive functional group, a non-reactive functional group, and combinations thereof; and
a second segment of controlled molecular weight and position that includes at least one monomer having a functional group selected from the group consisting of a reactive functional group, a non-reactive functional group, and combinations thereof;
wherein at least one of the functional groups of the at least one acrylic block copolymer can undergo a post-polymerization functionalization reaction with the reacting agent to make the at least one acrylic block copolymer crosslinkable upon exposure to an actinic radiation,
wherein the at least one acrylic block copolymer does not contain ethylenic unsaturation prior to the post-polymerization functionalization reaction,
wherein the precursor forms a pre-adhesive composition after the post-polymerization functionalization reaction of the at least one acrylic block copolymer, and
wherein the pre-adhesive prior to activation exhibits less than about 7.5% gel at about 99% or more solids.

* * * * *